United States Patent

[11] 3,634,644

[72] Inventors Ralph Ogden
 Park Forest, Ill.;
 William P. Lawson, Hammond, Ind.
[21] Appl. No. 787,873
[22] Filed Dec. 30, 1968
[45] Patented Jan. 11, 1972
[73] Assignee Ogden Engineering Corporation

[54] METHOD AND APPARATUS FOR WELDING TOGETHER BEAM COMPONENTS
20 Claims, 24 Drawing Figs.

[52] U.S. Cl................................................ 219/102,
 219/107
[51] Int. Cl.............................................. B23k 9/02
[50] Field of Search............................................. 219/101,
 102, 104, 107, 137, 158, 159, 161, 162

[56] References Cited
UNITED STATES PATENTS

| | | | |
|---|---|---|---|
| 3,408,475 | 10/1968 | Fier................................ | 219/125 PL |
| 3,469,067 | 9/1969 | Ogden et al.................... | 219/124 |
| 2,198,264 | 4/1940 | Caputo........................... | 219/102 |
| 3,154,665 | 10/1964 | Dunning et al. ............... | 219/124 |
| 3,410,982 | 11/1968 | Morris et al. .................. | 219/107 |

*Primary Examiner*—C. L. Albritton
*Attorney*—Mann, Brown, McWilliams & Bradway

ABSTRACT: A method and apparatus for welding together the end flanges and cambered or noncambered webs of girder forming I-beams, box beams, and the like, in which one or more webs are placed on top of one of the end flanges, and the thus associated beam components are simultaneously moved past floating welding heads at a welding station that fillet weld the web or webs to the end flange. These beam components are positioned in their normal load supporting positions for this welding operation, that is, the web and end flange are respectively vertically and horizontally disposed, and they are clamped together adjacent the welding heads by a roller-type clamping arrangement that also floats. The beam components pass to and from the welding station on roller conveyors with their ends each riding on a supporting car or cart, and, adjacent the welding station, the beam flange component i engaged by transverse position correcting rollers that engage its side edges, and the beam web component by web engaging rollers that are movement equalized. Downstream of the welding station, the flange component is engaged by a straightening device that overcomes bending of the flange along the fillets that are being welded. The beam components are driven at welding speed by a set of flange edge engaging rollers on the upstream side of the welding station, the welding station flange supporting clamping roller, and a flange-engaging roller at the flange-straightening device. The flange edge engaging rollers, the welding station web-engaging rollers, the welding heads and clamping rollers, and the flange straightening device are arranged to float with the beam components to accommodate camber and the like that may be built into the beam.

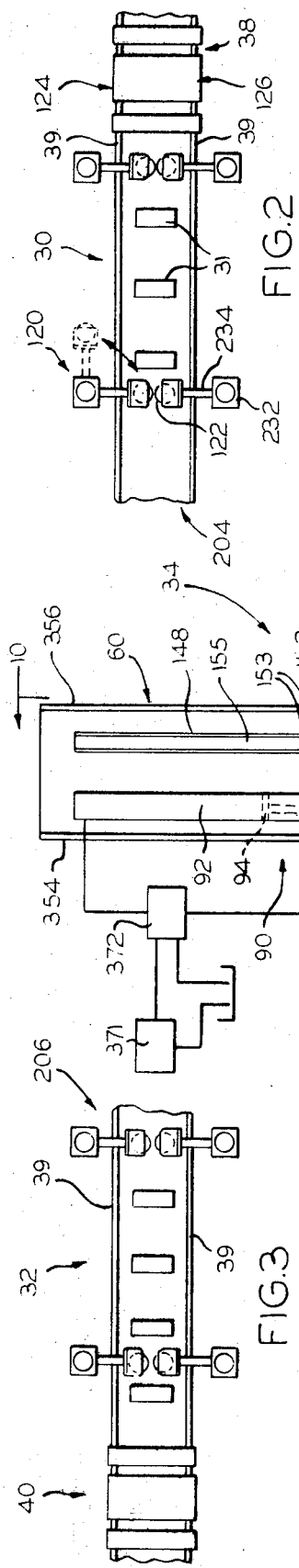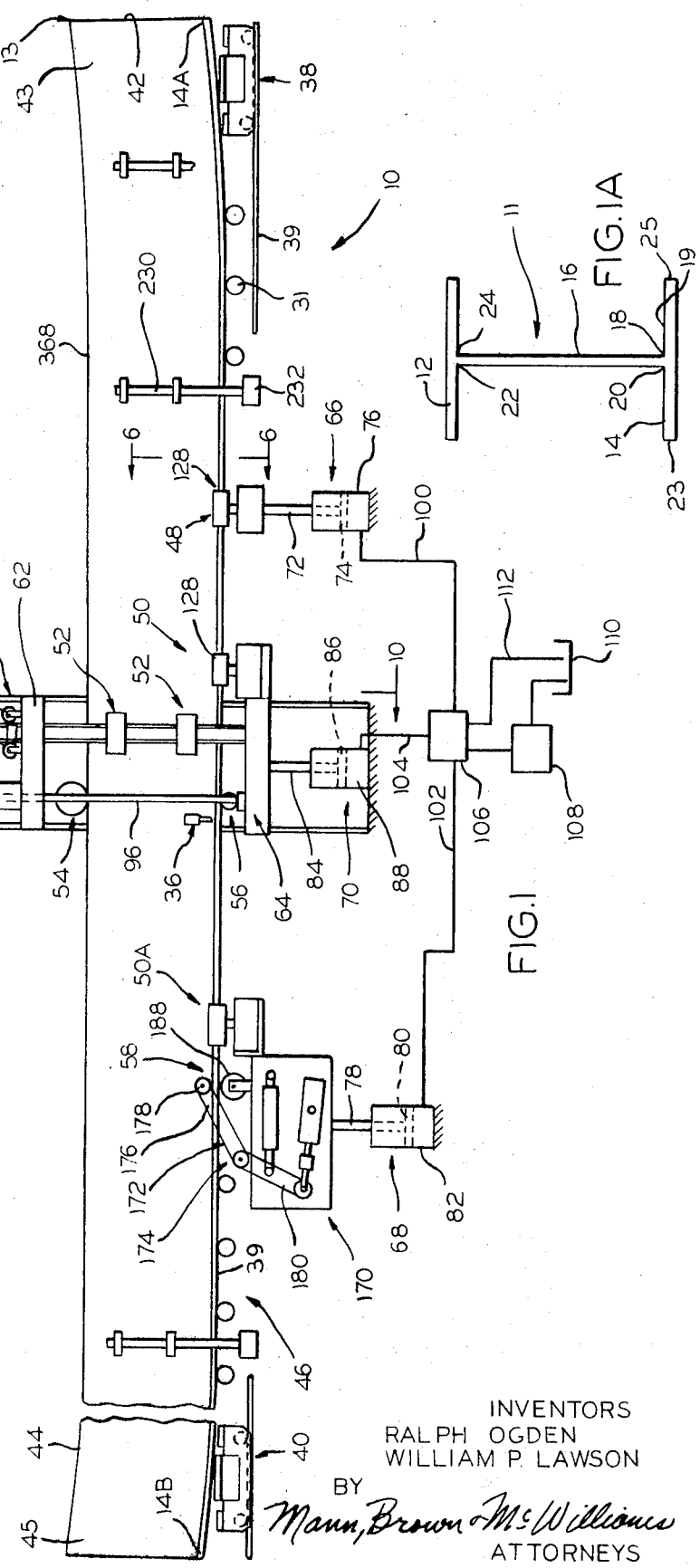

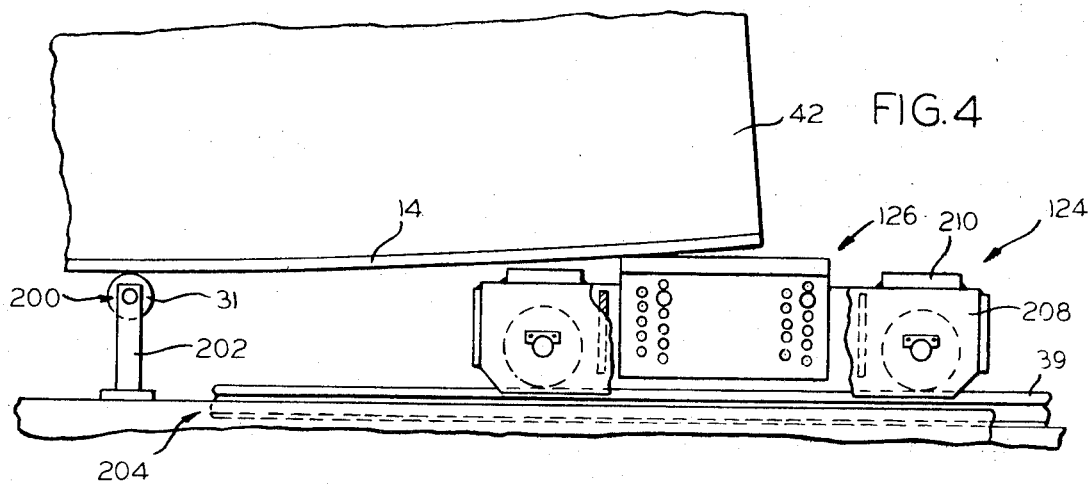
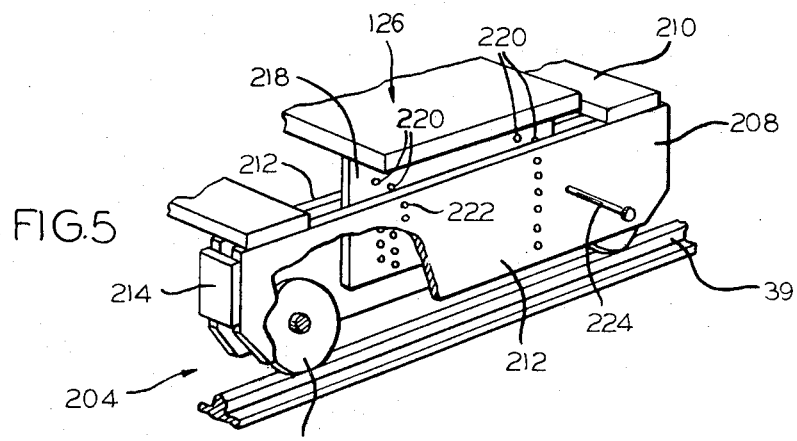
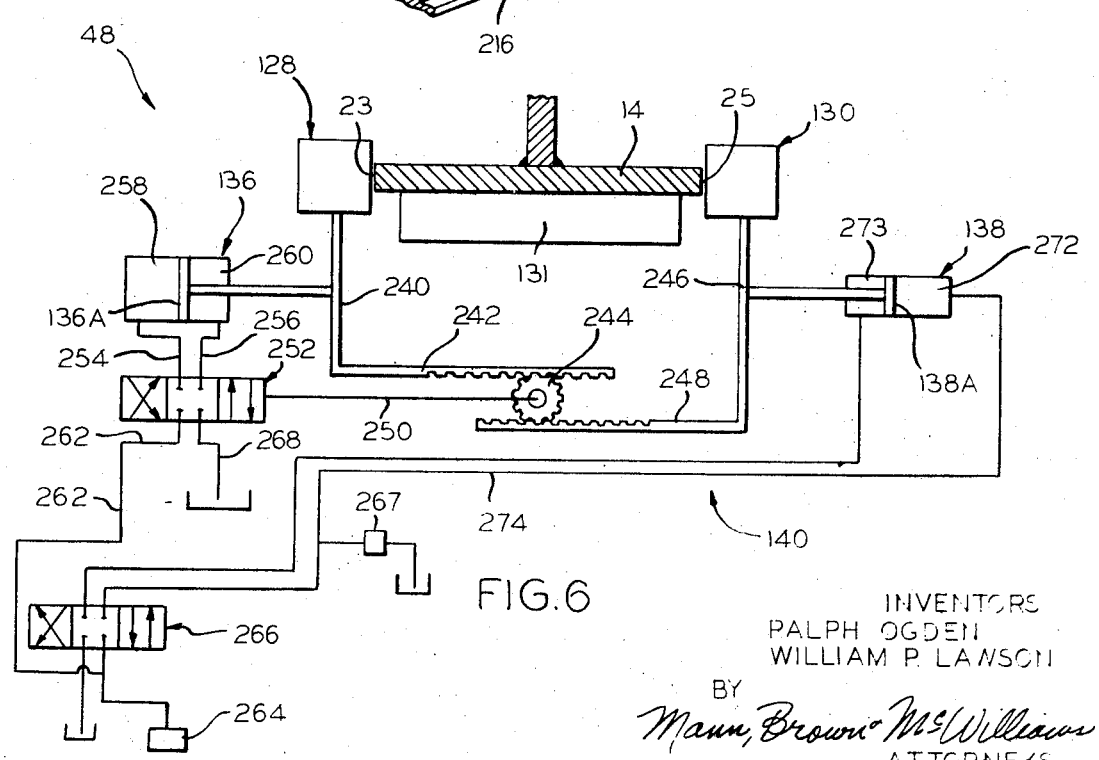

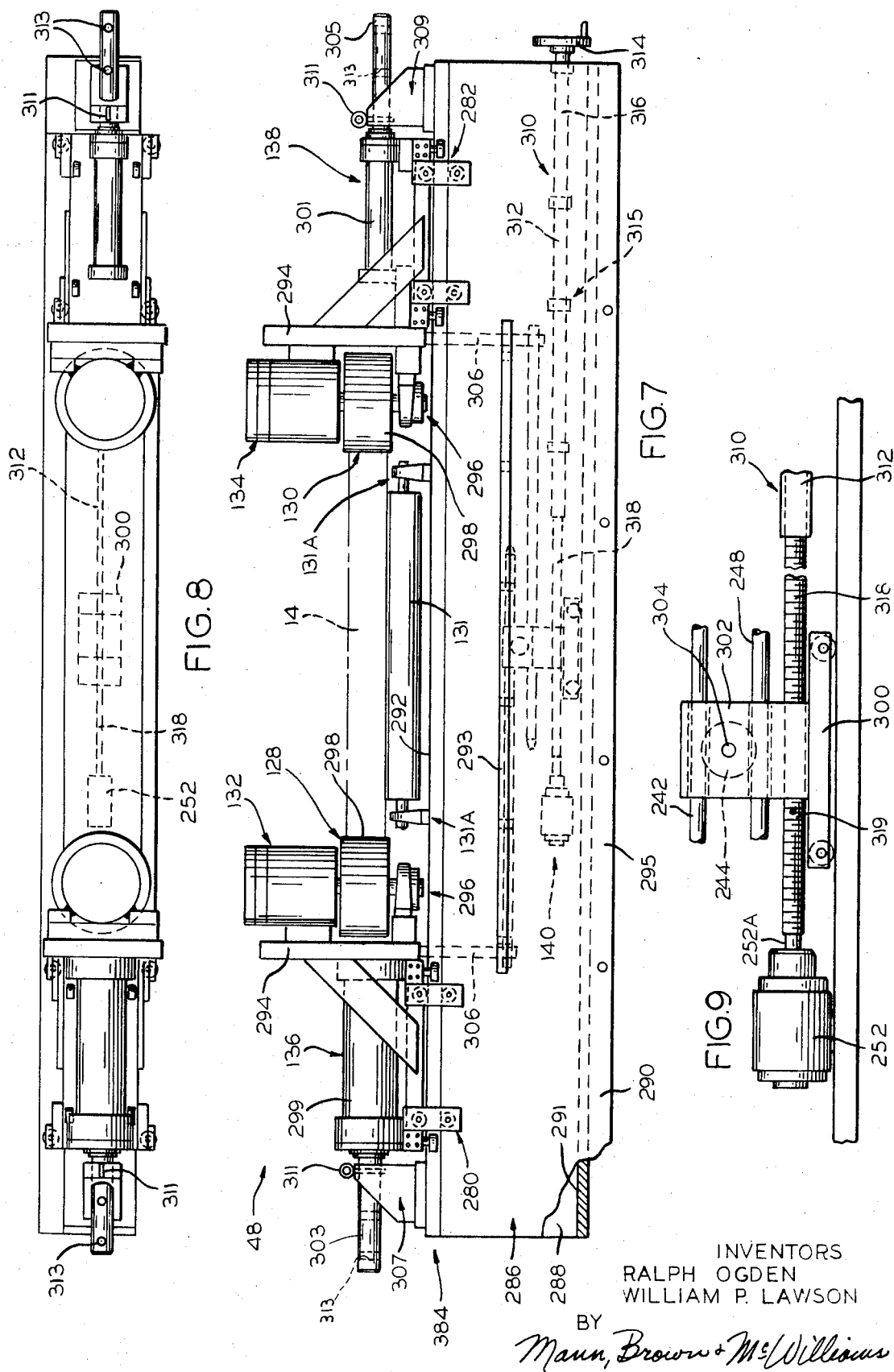

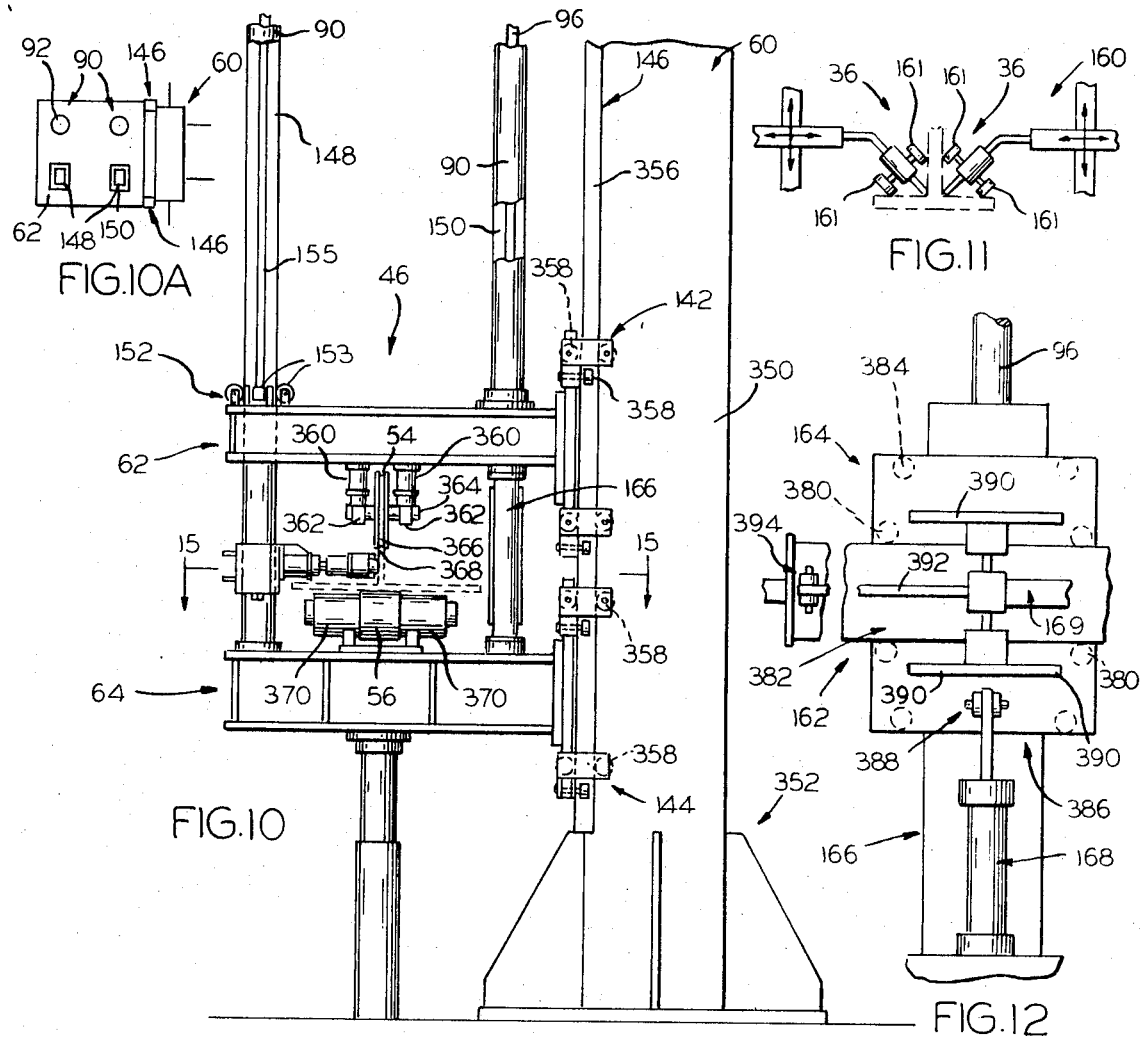
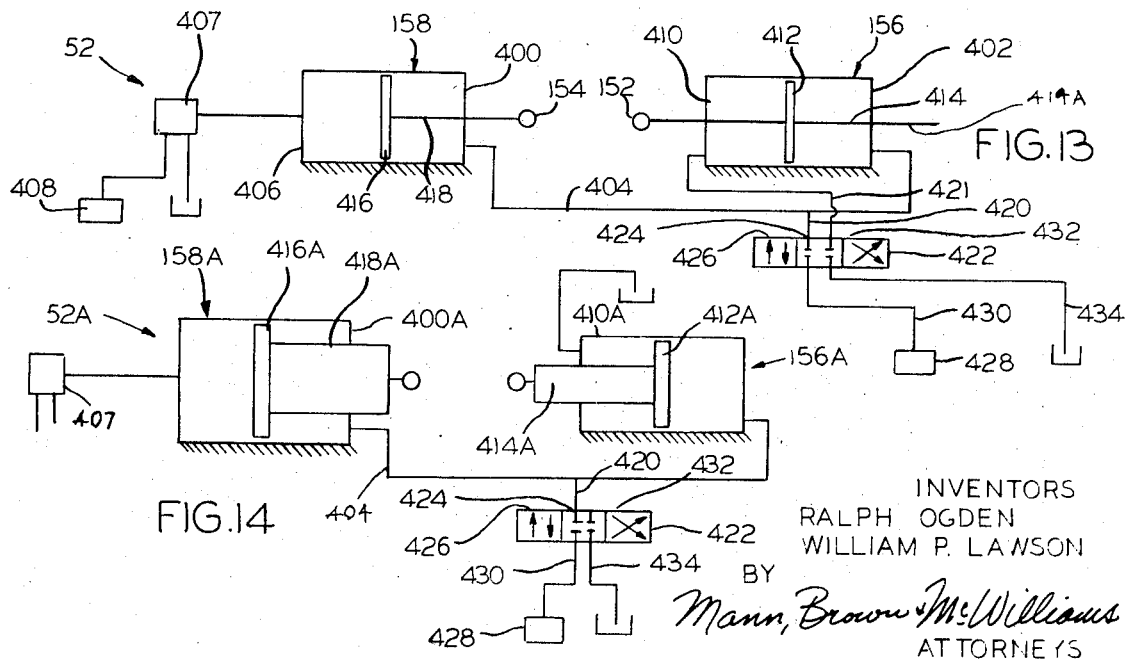

INVENTORS
RALPH OGDEN
WILLIAM P. LAWSON
BY
Mann, Brown & McWilliams
ATTORNEYS

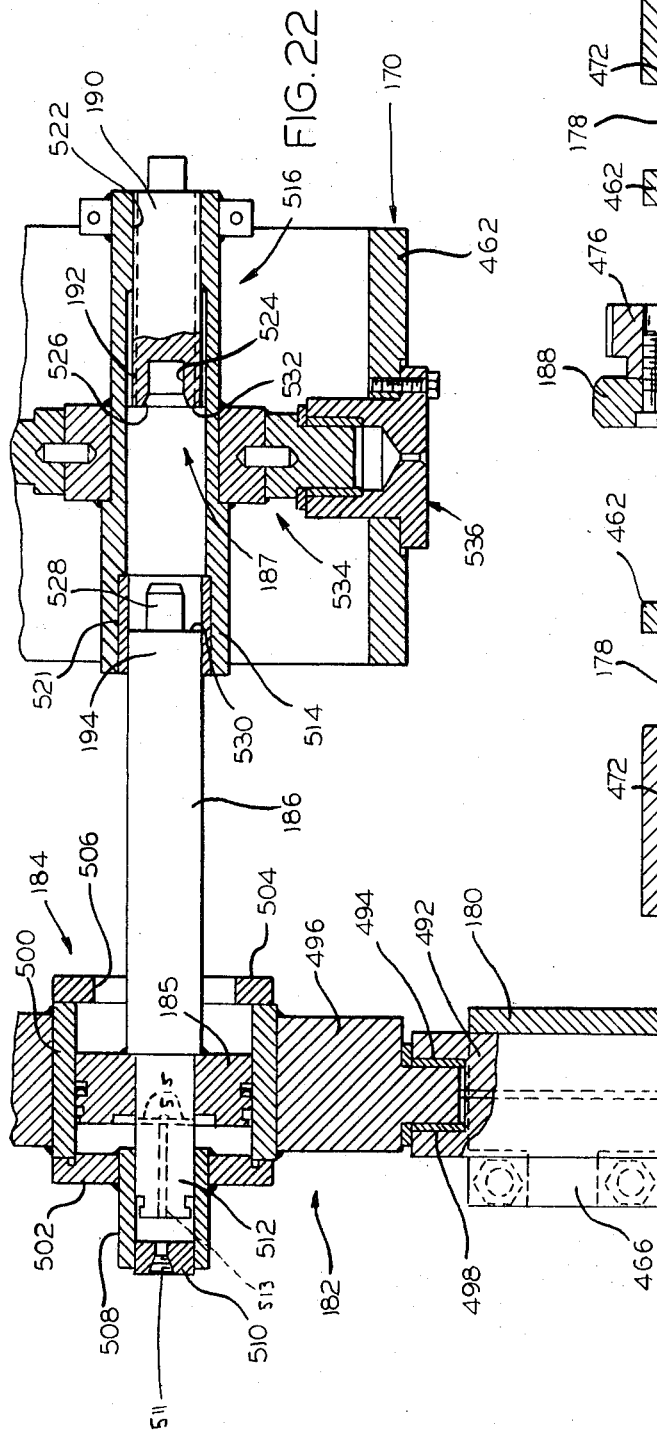

METHOD AND APPARATUS FOR WELDING TOGETHER BEAM COMPONENTS

This application is related to our application Ser. No. 580,314, filed Sept. 19, 1966, now U.S. Pat. No. 3,469,067 granted Sept. 23, 1969 the entire disclosure of which is hereby incorporated herein by this reference and the priority of which is claimed for all subject matter hereof that is common to said related application.

Conventional methods of welding beam components together call for the fitting and tack welding of the beam components, after which the beam components are permanently welded together by a separate welding procedure. In the case of I-beams, for instance, the end flanges and webs are tack welded in place, and then welders, using semiautomatic welding equipment, go over the beam to make the fillet welds and the like that permanently fix the beam parts together. In practicing these procedures, the beam components remain stationary and the welding equipment is moved along the fillet or the like.

It has become common practice to specify, especially for a larger size girder designed for heavy load-supporting functions, a camber in the web (a bend in the plane of the web) to compensate for the camber that will take place due to the weight of the beam itself, as well as some part of the load to be imposed on it, when the beam is put in its load-supporting position. This means that the web as formed for assembly with the end flanges will have a curved configuration in its plane (hereinafter called "web plane camber") that will in effect require the end flanges to be forced to conform to the web configuration. Since these beam structures are large and massive, fabrication of same has heretofore been a time consuming, difficult and costly affair.

Lindmark U.S. Pat. No. 3,159,129 discloses a variation from conventional procedures in providing a welding arrangement in which the welding apparatus remains stationary and the beam components are moved past it. However, the Lindmark arrangement requires that the I-beam be placed on its side (that is, the web is disposed horizontally), which is not satisfactory as the molten metal which results from the welding arc can burn through the relatively thin web plate, and the action of gravity on the web causes a camber problem laterally of the web that is difficult to compensate for.

A principal object of this invention is to provide a method and apparatus for welding together components of I-beams and the like which permits the elimination of tack welding and provides for feeding of the beam components past welding apparatus in the position the end flanges and webs will be disposed in when in normal use, as with the webs vertically disposed and the end flanges horizontally disposed.

Another principal object of the invention is to provide a method and apparatus for welding together beam webs and end flanges of the type indicated where the web and end flange to be welded are securely clamped together at the welding position by a floating device which accommodates the web plane camber that is frequently built into a web, with the welding heads also floating with the web and flange.

Still another principal object of the invention is to provide apparatus for automatically welding beam webs and end flanges together which accommodates a wide variety of beam sizes as well as variations in width and thickness of the end flange.

Yet another principal object of the invention is to provide a drive arrangement for moving the beam components longitudinally thereof past the floating welding station and which also accommodates web plane camber and gives complete control over the movement and positioning of the heavy massive beam components that are involved.

Other principal objects of the invention are to provide a flange-guiding arrangement that is self compensating in action to keep the end flange moving along the desired feed path, to provide a web-guiding arrangement in which the movements of the rollers thereof laterally of the web are equalized, to provide a simplified welding station arrangement including a monocolumn support for floating welding heads and web and flange clamping guiding arrangements, and to provide a flange straightening arrangement that acts on and floats with the flange to overcome tendencies of the flange to bend or bow as a result of the welding of the web to the flange.

Still other objects of the invention are to provide a method of welding beam components together which eliminates much of the preliminary handling and tack welding required, to provide apparatus for welding beam components together that permits the use of automatic welding equipment for such purposes, and to provide apparatus of the type indicated that is economical of manufacture, convenient to install and use, and adapted to welding a wide variety of beam sizes and shapes.

Further objects, uses, and advantages will be obvious or become apparent from a consideration of the following detailed description and the application drawings in which like reference numerals indicate like parts throughout the several views.

In the drawings:

FIG. 1 is a side elevational view diagrammatically illustrating one embodiment of the apparatus comprising the invention, largely in block diagram form, showing a cambered beam in the process of having its web welded to one of its end flanges and indicating the normal positioning of the beam components for welding purposes;

FIG. 1A is a transverse sectional view through a typical I-beam girder structure fabricated by the practice of this invention;

FIGS. 2 and 3 are plan views, again largely in block diagram form, illustrating the entry and exit roller conveyors associated with the apparatus of FIG. 1;

FIG. 4 is a large scale diagrammatic side elevational view of the trailing end of the beam components being welded in the showing of FIG. 1, illustrating the cart arrangement that is employed in conjunction with the entry conveyor for supporting the end of the beam;

FIG. 5 is a fragmental perspective view illustrating one side of the cart of FIG. 4;

FIG. 6 is a fragmental sectional view substantially along line 6—6 of FIG. 1, and largely in schematic block diagram form, illustrating the flange edge engaging guide roller device that is employed to maintain the flange in alignment with its desired feed path through the welding station;

FIGS. 7 and 8 are a side elevational view and a plan view respectively of a specific embodiment of the flange edge engaging guide roller device that is diagrammatically illustrated in FIG. 6, in which the guide rollers are driven;

FIG. 9 is a fragmental view of the lower portion of FIG. 7, on an enlarged scale, illustrating the specifics of the floating dual rack-type control device that is diagrammatically illustrated in FIG. 6, and which is arranged to permit the device of FIGS. 6–8 to be adapted for offcenter applications;

FIG. 10 is a diagrammatic cross-sectional view substantially along line 10—10 of FIG. 1, illustrating the specifics of the novel welding station monocolumn support and spaced platforms associated therewith which carry the welding station clamping rollers and welding heads together with flange and web guide roller devices;

FIG. 10A is a small scale plan view of the welding station shown in FIG. 10;

Figure 15:
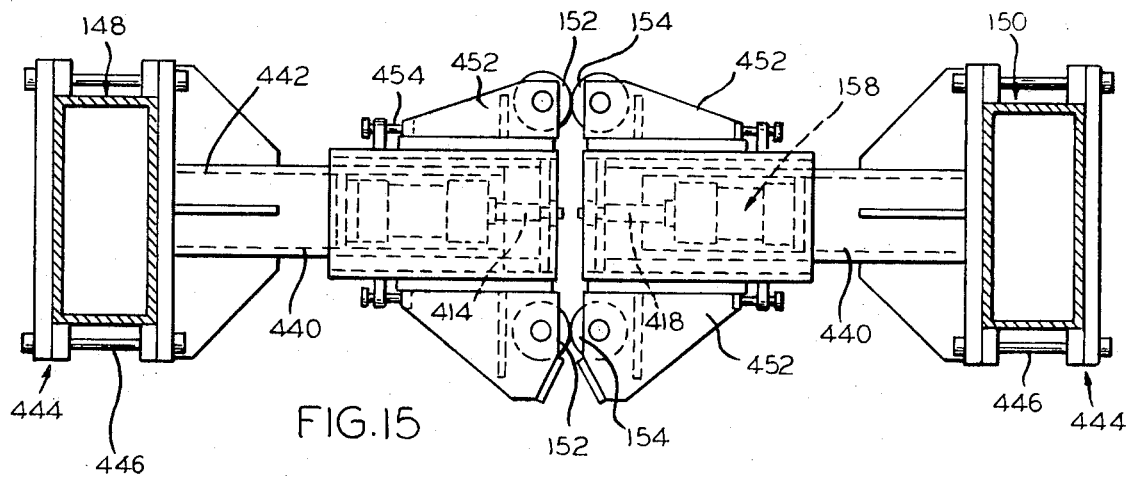
Figure 16:
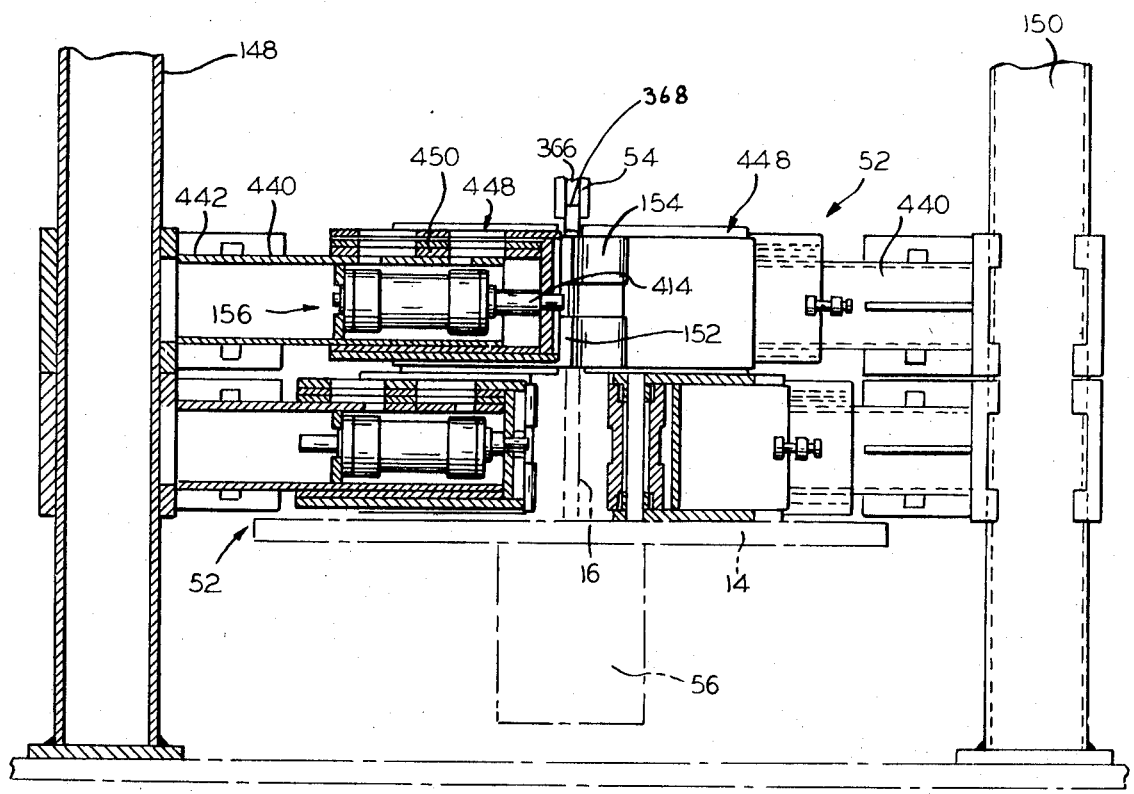
Figure 18:
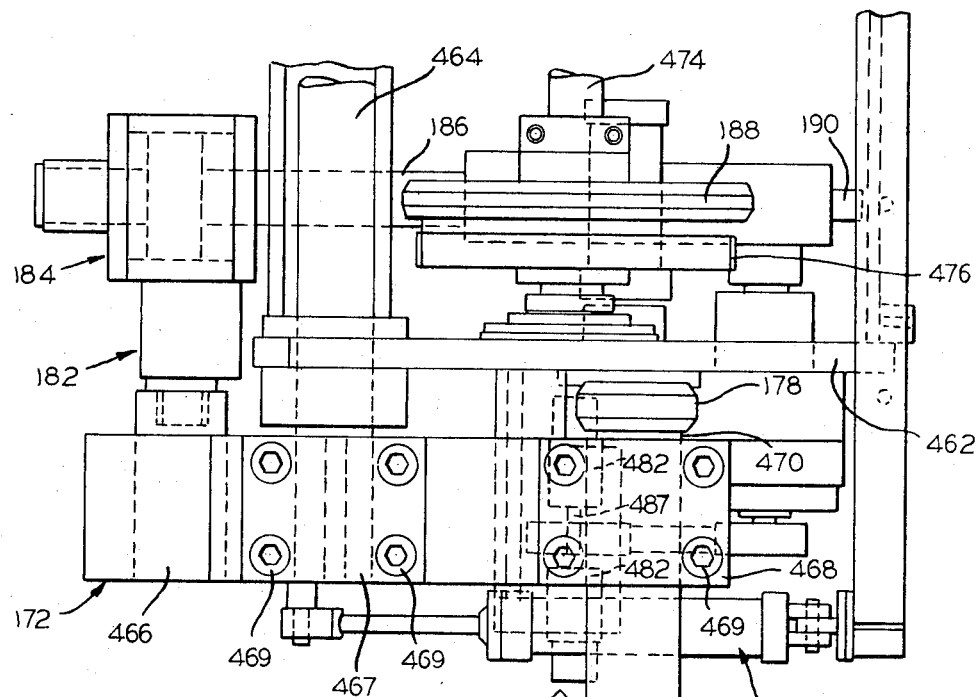
Figure 17:
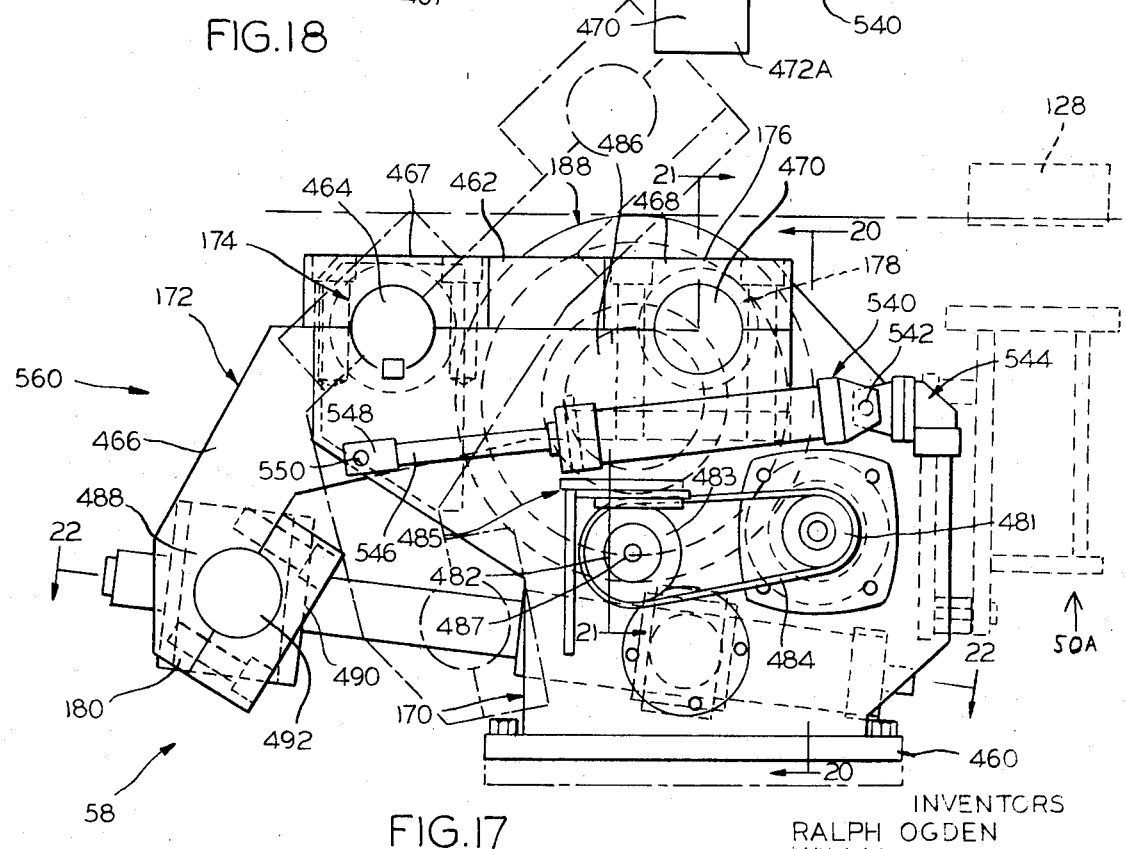
Figure 20:
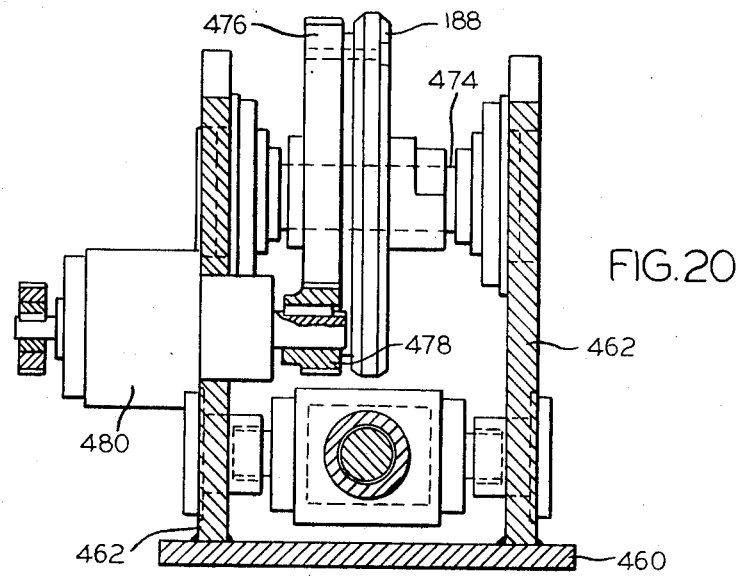
Figure 19:
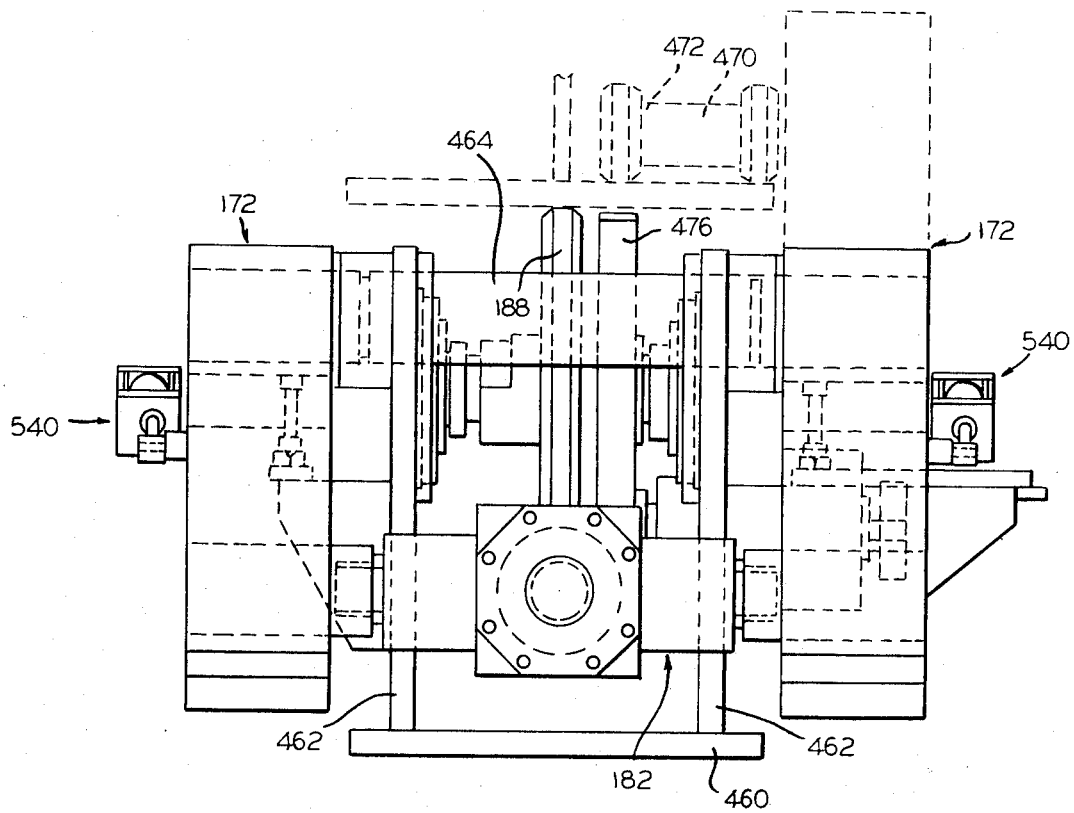

FIG. 11 diagrammatically illustrates the nature of the welding heads employed in accordance with this invention;

FIG. 12 is an enlarged fragmental view illustrating the manner in which the welding heads are floatingly mounted for floating with the fillets they are welding;

FIGS. 13 and 14 diagrammatically illustrate two different web guide roller devices in which the rollers thereof on either side of the web are equalized in their movements;

FIG. 15 is a fragmental cross-sectional view taken substantially along line 15—15 of FIG. 10 illustrating a specific embodiment of the web-equalizing device that is schematically illustrated in FIG. 13;

FIG. 16 is a front elevational view of the device as shown in FIG. 15, with parts being shown in section, with the upper set of web-engaging rollers being shown in their fully extended positions and the lower set of web-engaging rollers being shown in their retracted positions and with the location of the beam web and flange during welding being indicated in dashed lines;

FIG. 17 is a side elevational view of the flange straightening device that is shown in FIG. 1, illustrating a specific embodiment of same;

FIG. 18 is a partial plan view of the device shown in FIG. 17;

FIG. 19 is a rear elevational view of the device shown in FIG. 17, taken from the left-hand side of FIG. 17; and FIGS. 20, 21 and 22 are diagrammatic cross-sectional views taken substantially along lines 20—20, 21—21, and 22—22 of FIG. 17.

However, it is to be understood that the specific drawing illustrations provided are supplied primarily to comply with the requirements of the Patent Code, and that the invention may have other embodiments that are intended to be covered by the appended claims.

GENERAL DESCRIPTION

Reference numeral 10 of FIG. 1 generally indicates a diagrammatically illustrated embodiment of the invention that is employed for fabricating a beam or girder structure of the general type indicated at 11 in FIG. 1A, which, for illustrative purposes, is shown in the form of an I-beam having upper and lower end flanges 12 and 14 connected together by a web 16, these parts being assembled as by welding along fillets 18, 20, 22 and 24.

Commercially, beam structures of the type that may be fabricated by employing the principles of this invention can involve beam components with web width variations from 8 inches to 192 or more inches and with flange width variations from 8 inches to 36 inches or more, and with the girder structure involved having a length of up to 160 or more feet and weighing up to 100 or more tons.

Apparatus 10 is arranged to have the flexibility to handle girders of the type illustrated in FIG. 1A for the size ranges indicated as well as to accommodate girder structures in which the web is disposed to one side of the end flange longitudinal centerline, or in which the web and/or flange may vary in thickness or width laterally thereof, or the web may vary in height, in a particular girder to be fabricated.

Apparatus 10 in the form illustrated generally comprises an entry roller conveyor 30 and an exit roller conveyor 32 disposed on either side of a welding station 34 provided with floating welding heads 36 (see FIGS. 11 and 12) that weld the web 16 to the end flange at fillets 18 and 20 in an initial pass that is made by the web 16 and its underlying end flange 14 through apparatus 10, after which the two assembled components 14 and 16 forming subassembly 13 are turned over to again pass them through the apparatus 10 in conjunction with end flange 12 for similarly welding the latter to the web 16 at fillets 22 and 24.

Associated with the entry and exit roller conveyors 30 and 32 are carts or cars 38 and 40 (FIGS. 1, 4 and 5) which are mounted on rails 39 to ride lengthwise of and overlie the respective conveyors 30 and 32, and on which are rested the beam or girder ends 42 and 44. The conveyors 30 and 32 and welding station 34 defines a feed path 46 for the subassembly 13, along which are operatively mounted an end flange edge engaging roller drive and guide device 48 (FIGS. 6–9) that, in the embodiment shown, is interposed between the welding station 34 and the entry roller conveyor 30, an end flange edge engaging roller guide device 50 and a pair of web-engaging roller guide devices 52 (FIGS. 14–16) that are positioned at the welding station, together with clamping rollers 54 and 56 that clamp the web and end flange components together adjacent the welding heads 36 (FIGS. 10 and 16). Downstream of the welding station 34 and in alignment with the feed path 46 is an end flange straightening device 58 (see FIGS. 17–22) that overcomes tendencies of the end flange to bend or bow upwardly on either side thereof along the weld areas defined by fillets 18, 20, 22 and 24.

In the form shown, the welding station 34 comprises a monocolumn support structure 60 (see FIG. 10) positioned to one side of the feed path 46 and having shiftably mounted on same in cantilever fashion an upper platform 62 on which the clamping roller 54 is journaled and a lower platform 64 on which the clamping roller 56 is journaled, which platform 64 also carries the end flange guide roller device 50 and the web guide roller devices 52 as well as welding heads 36.

It is a feature of this invention that the devices employed for driving, guiding, welding and straightening the beam components being welded are capable of floating vertically with the girder structure being fabricated as it moves through the feed path 46 so that the welding apparatus accommodates itself to the configuration of the particular girder being fabricated rather than having to raise, lower, tilt or deform the girder components for automatic welding purposes. To this end, devices 48 and 58 and welding station platform 64 are mounted on the respective hydraulic cylinder devices 66, 68 and 70 that are only diagrammatically illustrated. In the case of hydraulic cylinder device 66, the end flange guiding and drive device 48 is shown mounted on top of piston rod 72 of piston 74 received in cylinder 76 while in the case of flange-straightening device 58, it is mounted on piston rod 78 of piston 80 that is received in cylinder 82; platform 64 is mounted on piston rod 84 of piston 86 that is received in suitable hydraulic cylinder 88.

The platform 62 may be supported by the platform 64 by a pair of hydraulic cylinder devices 90 each comprising a hydraulic cylinder 92 carried by platform 62 in which is operably mounted piston 94 connected to piston rod 96 that extends through platform 62 down to platform 64 for firm securement thereto. Hydraulic cylinder devices 90 are positioned on either side of clamping rollers 54 and 56.

The hydraulic cylinders 76, 82 and 88 that control the elevation of the devices 48 and 58 and platform 64 are preferably incorporated in a hydraulic system of the general type diagrammatically illustrated in FIG. 1 in which the cylinders 76, 82 and 88 are shown in the simplified single-acting cylinder form illustrated for purposes of disclosure in which they are connected by suitable conduits 100, 102 and 104 to a suitable hydraulic liquid control device 106 that is supplied with hydraulic liquid by a suitable pump 108 from tank 110. Pump 108 may be any suitable variable displacement pump that provides hydraulic liquid under pressure to the respective cylinders 76, 82 and 88 under the control of valve device 106 when the devices 48, 58 and platform 64 are to be raised and valve device 106 is also provided with a suitable connection for discharging hydraulic liquid from cylinders 76, 82 and 88, respectively, through valve 106 and back to tank through suitable conduit 112. Parenthetically, it is pointed out that the hydraulic system here described is intended only to adequately illustrate the principles involved as it is contemplated in practice that double acting hydraulic cylinder devices and appropriate associated controls and the like will be employed to efficiently perform the functions contemplated by this invention, and that practical embodiments will be apparent to those skilled in the art after having the benefit of this disclosure.

Operably associated with the entry and exit conveyors 30 and 32 are spaced pairs of retractable supports 120 (see FIGS. 2 and 3) each provided with web-engaging rollers 122 and adapted to swing such rollers between the two positions indicated in FIG. 2; in the full line position the web is supported in the vertical position indicated in FIG. 1 while in the dashed line position the roller conveyors are opened up for ready application of the end flange and web thereto by an overhead conveyor or the like (not shown). Several of the devices 120 are illustrated in diagram form in FIG. 1.

The carts 38 and 40 each comprise (see FIGS. 4 and 5) a wheeled frame 124 provided with a vertically adjustable platform 126 that may be appropriately elevationally adjusted to accommodate the configuration of the particular girder structure to be fabricated.

The end flange edge guide roller and drive device 48 generally comprises a pair of flange edge engaging rollers 128 and 130 driven by suitable motors 132 and 134, respectively (see FIGS. 6–9), with the rollers 128 and 130 being respectively biased against the edges 23 and 25 of the end flange by the respective hydraulic devices 136 and 138 (device 136 being dominant relative to device 138, as by being of larger diameter than device 138) that are embodied in a control arrangement 140 (see FIG. 6), whereby the flange edge engaging rollers 128 and 130 effect a centering action on the end flange and bias it from drifting to one side or the other of the feed path 46. Device 48 includes a roller 131 (see FIG. 6) that engages the underside of the end flange. The devices 50 and 50A are similar to device 48 except their rollers 128 and 130 are idlers.

As indicated in FIG. 10, the platforms 62 and 64 are respectively secured to carriages 142 and 144, respectively that ride along trackways 146 formed along either side of column structure 60 at one side of the feed path 46. Platform 64 has fixed thereto a pair of spaced guide posts 148 and 150 which extend upwardly through platform 62 through appropriate roller guide devices 152 in which the rollers 153 thereof ride on trackways 155.

The web guide roller devices 52 (see FIGS. 13–16) are applied in vertically spaced relation between and on the posts 148 and 150 and each includes spaced pairs of guide rollers 152 and 154 that are biased against the web by hydraulic cylinder devices 156 and 158, respectively. The devices 156 and 158 may be arranged in accordance with either of the embodiments shown in FIGS. 13 and 14 to insure, in accordance with this invention, that movement inwardly or outwardly of the set of web engaging rollers 152 of each device 52 is accompanied by a corresponding and equal movement of its opposing set of rollers 154.

Welding heads 36 are mounted on platform 64 in the form of a dual welding head assembly 160 (see FIG. 11) in which the respective heads ride on the web and flange on rollers 161, and are free to float vertically and laterally (as indicated by the arrows of FIG. 11) of the beam components as the welding operation proceeds in following the fillets being welded, following the teachings of Ogden and Lawson U.S. Pat. No. 3,325,625. In achieving this in the embodiment illustrated, each welding head 36 is secured to a horizontally floating carriage 162 (FIG. 12) that is floatingly mounted on a vertically floating carriage 164 riding on the respective post structures 166 carried by the platform 64 through which the respective piston rods 96 of hydraulic cylinder devices 90 extend. The guide rollers 161 of heads 36 are arranged in accordance with said Ogden and Lawson patent for riding along the girder fillets. Cylinder devices 168 and 169, which may be either hydraulically or pneumatically operated, are employed to initially position the welding heads as required for appropriate welding relation with the fillets involved and then to bias the welding heads in this position (any suitable controls may be employed for this purpose). Irregularities in the web and flange surfaces engaged by the welding head rollers will cause lateral and vertical shifting movements of the heads which are absorbed by the vertical and lateral floating action of the respective carriages 162 and 164.

The flange straightening device 58 in practice may be arranged in accordance with the specific embodiments shown in FIGS. 17–22 and comprises a suitable frame 170 supporting a pair of swing arms 172 that are disposed on either side of the feed path 46 and are journaled bellcrank fashion at 174 to define upper end portions 176 that carry laterally adjustable rollers 178 that are adapted to be clamped against the upper surface of the end flange on either side of the web (see FIGS. 17 and 19), and lower end portions 180 that are connected together by a cross head structure 182 that includes a short stroke hydraulic cylinder device 184 (see FIG. 22) having a piston 185 carried by a piston rod 186 that cooperates with an adjustable seat or abutment structure 187 carried by the frame 170. Frame 170 journals end flange engaging roller 188 against which the end flange is pressed by clamping rollers 178.

Swing arms 172 are moved between the full line retracted position and the dashed line extended positions of FIG. 17 to permit the end flange to move under the clamping rollers 178, after which the swing arms are lowered to bring clamping rollers 178 into engagement with the upper surface of the end flange, which movements changes the piston rod 186 of device 184 from the full line fully retracted position of FIG. 22 to an operating position adjacent a threaded abutment member 190 of seat structure 187 that then may be turned to bring its end 192 (see FIG. 22) into engagement with the piston rod end 194, whereupon the hydraulic cylinder device 184 is actuated to bias the piston rod 186 to the right of FIG. 22 against abutment 190 to apply a downward bias on either side of the end flange of a sufficient magnitude to overcome flange bending as a result of the welding operation. The adjustability of abutment member 190 provides adjustment for different nominal flange thicknesses while staying within the range of short stroke device 184. Device 58 carries an end flange guide roller device 50A that is identical to device 50 of welding station 34.

OPERATION

Assuming an I-beam with web plane camber is to be fabricated, the retractable supports 120 associated with the entry conveyor 30, at least on one side thereof, are retracted to swing their rollers 122 to the dashed line position of FIG. 2 and the cart 38 is moved as far as necessary toward the far end of the conveyor 30 for application of the end flange 14 onto the supporting rollers 31 thereof. This is done by an overhead crane or cranes that lift the end flange 14 from a stockpile or the like and lower same onto the conveyor 30 in a more or less horizontal centered position between the flange edge engaging rollers of device 48, which are preliminarily moved to their outwardly disposed extended positions to facilitate application of the end flange to the entry conveyor. While the overhead crane still supports the end flange, the cart or car 38 is moved under the trailing end 14A of the end flange 14, with its platform 126 having been positioned or elevated slightly more than the extent required to contour the end flange in accordance with the web plane camber of the web, after which the end flange is fully lowered and released from the overhead crane with the result that its trailing end 14A is thus supported by the cart 38 while the rest of its weight is resting on conveyor 30. Its leading end 14B should be positioned between the rollers 128 and 130 of flange guide and drive device 48, which is then elevated to dispose its rollers at the level of the end flange (by operating its control valve 106 to supply the necessary hydraulic liquid to cylinder 76) and is actuated to bring the respective rollers 128 and 130 against the end flange edges 23 and 25, and locate the leading end of the end flange 14 with respect to the feed path 46, the trailing end 14A being shifted as may be necessary in any convenient manner to obtain full alignment with the feed path 46.

A web 16 is then crane lifted from a stockpile or the like onto the end flange 14, and is lowered into position on the top surface 19 of the end flange so that the web 16 will stand in an upright position on the end flange 14 and be suitably indexed with respect to the end flange longitudinally and laterally with respect to the center of the feed path and conveyor 30. For purposes of the procedure being described it will be assumed that the web is to be centered along the longitudinal centerline of the end flange. Flange guide and drive device 48 is then elevated so that its flange undersurface engaging roller 131 lifts the flange end to conform to any web plane camber present and support the web weight at end 45. The retractable supports 120 are then actuated to move the rollers 122 into clamping relation with the web to hold it upright, after which the overhead crane may be detached from the web. The rollers of devices 50 and 52 are separated to receive the subassembly 13.

It is pointed out that, as previously indicated, it is frequently desirable to build a camber into the web 16 in the plane thereof, and in the showing of FIG. 1, the web 16 has a curvature convex downwardly in its plane, which is the opposite of the normal installation configuration of the beam resulting from the fabrication steps disclosed herein. As the entry conveyor 30 is essentially flat in its longitudinal plane, the web 16 will not engage the end flange along the full length thereof.

However, at the trailing end 43 of web 16 substantial contact is achieved by employing the cart 38, and the leading end 45 will be clamped to the flange as it passes through the welding station 34. Webs having a camber in the other direction present a similar problem at the midportion of the beam, this being overcome by the clamping action at the welding station as the beam components being welded pass therethrough; under these circumstances, the mounting of the trailing end of the beam components on the cart 38 avoids the end dropping into the space between rollers as it moves along the entry conveyor 30 and avoids applying the weight of the web to the individual rollers 31. This condition is present in connection with the subassembly 13 shown in FIG. 1 when it is inverted for rerouting through apparatus 10 to apply the second end flange 12 thereto.

When it is desired to start the welding operation, the drives of end flange engaging rollers 128 and 130 are actuated to start the subassembly 13 moving towards the welding station, and hydraulic devices 70 and 90 are operated to separate the clamping rollers 54 and 56 to receive the leading end 44 of the subassembly and to position platform 64 so that the clamping roller 56 will be positioned to engage underneath and support the approaching end flange. As the leading ends of the web and end flange move over roller 56, hydraulic devices 70 and 90 are operated to firmly clamp the end flange to the web and position the clamping roller 56 at the desired working elevation, with the roller guide devices 50 and 52 being operated to bias their respective rollers 128 and 130, and 152 and 154, against the end flange and web respectively, these devices now being set to provide the steering and bracing functions they are designed to provide for the full length of the subassembly 13.

The welding heads 36 are positioned and ignited as the leading end 44 of the subassembly 13 moves into their plane of operation. Run on tabs fixed to the leading end 44 in alignment with the fillets may be used if desired. Prior to being ignited, the welding nozzles of the welding heads are adjusted and positioned appropriately for fillet welding purposes through the operation of the hydraulic arrangement shown in FIGS. 10 and 11 and the adjustments described in said Ogden and Lawson patent (forward movement of subassembly 13 being halted as may be necessary to achieve the positioning desired). When fully adjusted, movement of the subassembly is again established, and the heads 36 are ignited, and, as the leading end of the subassembly moves along between them, they make the necessary weld at the fillets 18 and 20.

As the leading end 44 of the subassembly 13 moves over straightening device 58, its hydraulic cylinder device 68 is actuated to elevate it as required to position its roller 188 up against the undersurface of the end flange, with the swing arms 172 having been moved to their elevated positions to permit the end flange to pass under the clamping rollers 178. The clamping rollers 178 are brought down against the top surface of the end flange with the force required to overcome the bending as a result of welding at the fillets 18 and 20.

The hydraulic cylinder devices 66, 68 and 70 are operated as required to elevationally position the leading end of the subassembly 13 so that as the latter moves in the direction of exit conveyor 32, it will be disposed above cart 40, whereupon the subassembly leading end 44 is lowered onto the cart 40. At this point, the valve 106 is operated to open hydraulic cylinders 76, 82 and 88 to tank so that the drive device 48, platform 64 and the load it carries and flange-straightening device 58 will be free floating to follow the contour of the subassembly being fabricated. In this connection, it is preferred that the hydraulic circuiting for the respective cylinders 76, 82 and 88 include relieving type regulating valves (not shown) which permit the respective cylinders to sufficiently support the respective devices 48 and 58 and the platform 64 to offset the weight they carry when the indicated cylinders are connected to tank, and support a sufficient portion of weight of the subassembly so that the carts will not be overstressed, while still permitting the devices 48, 58, and platform 64 to float vertically as the subassembly moves through welding station 34 (the hardware necessary and the arrangement thereof can be readily assembled by those familiar with the hydraulic arts).

The subassembly 13 now proceeds at welding speed through the welding station along its feed path 46, it being driven by drive device 48, clamping roller 56, and flange straightening device roller 188. As the subassembly 13 proceeds down exit conveyor 32, the retractable support devices 120 there located are actuated to bring their rollers 122 into bracing relation with the web 16.

As the trailing end of the subassembly 13 approaches the welding station 34, its weight will gradually be lifted off the cart 38 until the cart 38 loses traction with the end flange 14 and is left standing on its rails 39. As the trailing end 42 leaves cart 38, valve device 106 is operated to transfer the support of this end of the girder to roller 131 of device 48 and to the clamping roller 56 and its platform 64. The cooperating action of device 48 continues until the subassembly end 42 reaches it, while the support of platform 64 continues until the trailing end 42 of the subassembly has passed over roller 56, just prior to which time hydraulic devices 90 are actuated to release the clamping action provided by rollers 54 and 56 while hydraulic device 70 maintains the platform 64 at the operating elevation until the trailing end 42 of the subassembly has passed by the welding heads 36 (runoff tabs fixed to the trailing end 42 in alignment with the fillets may be employed if desired). The subassembly then completes its passage through the device 58 onto exit conveyor 32, the device 58 being lowered as the trailing end 42 passes over roller 188 to rest the trailing end on the conveyor 32.

The subassembly 13 is then maneuvered in any suitable manner to invert it and return it to entry conveyor 30 for application thereto of the other flange that is engaged by the end flange guiding and driving rollers 128 and 130 and clamping rollers 56, 178 and 188.

It will thus be seen that a method and apparatus for fabricating I-beams and the like has been provided by this invention that is especially adapted to take care of beam designs in which web plane camber is built into the web. The invention accommodates the camber of the web, where present, in the manner indicated. Where no camber is present, carts 38 and 40 are still employed to provide for smooth transfer of the leading and trailing ends of the subassembly between the individual rollers 31 of the respective roller conveyors 30 and 32. The specific floating arrangement of welding heads 36 that is disclosed insures uniform fillet welding of the web to its end flanges.

Furthermore, the laterally acting guide rollers of devices 48, 50 and 50A permits the apparatus to accommodate beam components in which the end flange varies in width longitudinally of the beam, as is occasionally provided for in I-beam design, while the laterally acting guide rollers of devices 52 permit variations in the web thickness while holding the web centered in the center of the feed path. The floating character of the driving, clamping, guiding and straightening devices employed permits the apparatus to accommodate variations in end flange thickness that is likewise occasionally provided for in I-beam design. As hereinafter described, devices 48, 50, 50A and 58 are arranged to accommodate off center positioning of webs on an end flange, which is achieved by centering the web with the feed path and applying the end flange to the feed path in an offcenter position.

SPECIFIC DESCRIPTION

It will be appreciated that the showing of FIGS. 1–3 is largely diagrammatic in nature as it is intended that these figures illustrate principles rather then specific pieces of hardware. The various devices and apparatus referred to will now be specifically described with references to the appended drawing FIGS. 4–22 to the extent necessary to provide a complete understanding of the nature of the invention.

THE ENTRY AND EXIT ROLLER CONVEYORS

The entry and exit roller conveyors may be of any suitable type of roller conveyor, which normally includes a roller 31 suitably journaled as at 200 in suitably spaced supports 202 (FIG. 4). Under normal conditions, rollers 31 are idler rollers. It is contemplated that one or more end flange guiding and drive devices 48 may be positioned along the length of the conveyor 30 as may be necessary to insure ready centering and movement at welding speed of the girder structure being welded, depending upon the length and height of same to be encountered in a particular situation. In practice, the exit conveyor as such may be omitted in favor of a single roller or even a fixed support positioned a short distance downstream of flange straightening device 58, since at this point the flange is welded to the web and its leading end rests on cart or car 40.

THE CARTS

As indicated in FIGS. 2 and 3, the carts or cars 38 and 40 ride on rails 39 which, in the case of each of the conveyors 30 and 32, are disposed on either side of the rollers 31 thereof and define the respective trackways 204 and 206. One specific form of cart is shown in FIGS. 4 and 5 in which the frame 124 thereof comprises a pair of trucks 208 that respectively ride on the respective rails 39 and are joined together by suitable type plates 210. The trucks 208 each comprise spaced side plates 212 joined together by suitable end plates 214 and journaling suitable wheels 216 in any suitable manner. The plates 212 are spaced apart to receive the respective depending flanges 218 of the cart platform 126, each of which are formed with a plurality of pin-receiving openings 220 adapted to be aligned with selected holes 222 of the respective plates 212 at the desired elevation of platform 126 whereby pins 224 may be applied between the two to support the platform 126 at the desired elevation.

RETRACTABLE WEB SUPPORTS AT ENTRY AND EXIT CONVEYORS

The retractable supports 120 are only diagrammatically illustrated, as they may be of any suitable type. In the form shown, each comprises a post structure 230 rotatably mounted on a suitable base structure 232 and provided with suitable arms 234 at the ends of which the roller devices 122 are mounted. Any suitable arrangement may be employed to swing the arms 234 between the two positions illustrated and arms 234 may include suitable hydraulic cylinder devices (not shown) for clamping rollers 122 against the web and accommodating offcenter positioning of the webs when the system is arranged to accommodate this. The post structures 230 may be provided with suitable retractable bracing supports and bases 232 may be mounted for shifting movement laterally of the feed path to provide added space to manipulate the end flanges and webs.

END FLANGE GUIDING AND DRIVE DEVICE

The principal features of the device 48 are diagrammatically illustrated in FIG. 6, while FIGS. 7–9 illustrate a specific embodiment of same. As previously indicated, the function of the device 48 is to keep the end flange centered as it moves along its pathway, in addition to driving same in a forward direction. To achieve this end, control arrangement 140 is provided in which the roller 128 carries with it through a suitable connecting structure 240 a rack 242 that meshes with a pinion 244, while the roller 130 carries with it through connecting structure 246 a rack 248 that likewise meshes with the pinion 244, but on the opposite side thereof from the rack 242. The pinion 244 is free to roll in either direction (to the right or left of FIG. 6) longitudinally of the racks, and is connected by a suitable link 250 to a tracer valve diagrammatically illustrated at 252 as a three-way valve interposed between conduits 254 and 256 that communicate respectively with the head end or chamber 258 and rod end or chamber 260 of the larger hydraulic device 136. The tracer valve 252 is fixed in location in the form illustrated and establishes connection between the respective conduits 254 and 256 and conduit 262 communicating with a suitable source of hydraulic pressure liquid, such as pump 264, and line 268 communicating with tank. Link 250 is suitably connected to the tracer valve spool at its extension or push rod 252A (FIG. 9), which spool is spring biased to set the tracer valve spool at the right-hand position of valve 252.

The head end or chamber 272 of hydraulic cylinder device 138 is connected to a source of hydraulic liquid under uniform pressure through suitable conduit 274, symbolized in the drawings by valve device 266 and pump 264. The rod end or chamber 273 of cylinder device 138 is connected to tank through the same valve 266, which is arranged to be set during operation of device 48 to supply hydraulic liquid under uniform pressure to head end 272 of cylinder device 138, and connect rod end 273 to tank. Cylinder device 136 is of larger diameter than device 138 to be dominant when the end flange is to be shifted to the right of FIG. 6, but need not be if it is supplied with hydraulic liquid under sufficiently higher pressure than that supplied to device 138; thus, device 136 is to be of larger capacity than device 138.

In initially positioning the rollers 128 and 130 relative to an oncoming end flange 14 (assuming an on center web application), pinion 244 is disposed (by employing suitable adjustment means, such as that shown in FIGS. 7–9) in vertical alignment with the longitudinal center of the feed path that the end flange 14 is to take with valve 252 disposed in its null position, and hydraulic device 138 is operated by supplying hydraulic liquid to the head end 272. When roller 130 contacts flange edge 25, the pressure of the supplied liquid can be increased to a suitable uniform pressure, such as 1000 pounds per square inch. The inward movement of the piston 138A carries its piston rod with it and the piston rod in turn, carries with it connecting structure 246 which, in turn, carries with it rack 248. Rack 248, moving inward to the left, rolls pinion 244 to the left. Pinion 244 moves link 250 to the left. Link 250 moves tracer valve spool 252A to the left of the null point and valve 252 then supplies chamber 258 of hydraulic device 136 with hydraulic fluid and, at the same time, allows fluid to be displaced to tank from chamber 260. This results in piston 136A moving inward carrying its piston rod with it which in turn, carries connecting structure 240 with it which in turn, moves rack 242 to the right. Rack 242 moving inward to the right rolls pinion 244 to the right. Pinion 244 moves link 250 towards the right. Movement to the right of link 250 permits the spring load on valve spool 252A to shift it to the right toward null position. The construction of valve 252 is such that the inward movement of piston 136A (and its roller 128) is only trailing that of piston 138A (and its roller 130) by a negligible amount and even this amount is made up when piston 138A ceases to move inward (as when the flange is centered with rollers 130 and 128 both contacting its edges 25 and 23). Thus, pinion 244 is aligned with the feed path centerline and the spool of valve 252 is positioned to dispose valve 252 at its null point and thereby block communication between conduits 254, 256 and 262 and 268, respectively. Rollers 128 and 130 are moved toward and away from each other (between their extended and retracted positions) by operating valve 266 to move roller 130 in the desired direction, roller 128 automatically moving oppositely through the action of rack 248 on pinion 244 that causes link 250 to operate valve 252 in the appropriate manner. Thus, if rollers 128 and 130 are to be moved to their outermost (retracted) positions, valve 266 is positioned to move the piston 138A of device 138 to the right of FIG. 6, and control arrangement 140, through the action of pinion 244, operates valve 252 to move piston 136A of device 136 to the left of FIG. 6 a corresponding amount, such movement of roller 128 halting when valve 252 returns to its null point.

As long as the end flange remains constant in width and in alignment with its feed path, roller 128 is held against movement due to the locking out of the head and rod ends of its hydraulic device 136, and roller device 130 clamps the end flange against the roller 128 under the action of hydraulic device 138, thus precluding drift tendencies.

If the end flange includes a widened portion, as the latter moves between rollers 128 and 130, roller 130 and its rack 248 move to the right because of the wedge action involved (conduit 274 includes a suitable relieving type regulator device 267 to permit movement of piston 138A against the pressure in the head end of its cylinder 138), thus rolling pinion 244 to the right along rack 242 and actuating the tracer valve 252 to supply hydraulic liquid under pressure to the rod end 260 of cylinder device 136 thus moving roller 128 to the left as is necessary to accommodate the flange widened portion while still maintaining the flange centered. Valve 252 keeps roller 128 in very close agreement with roller 130. When the next uniform width of the end flange is reached, movement of roller 130 to the right ceases, and the equally spaced positions of rollers 128 and 130 on either side of the feed path centerline disposes the pinion 244 in alignment with the feed path centerline, with cylinder 136 again locked out; a reduction in flange width is accommodated similarly but in an opposite manner. Thus, lateral movement of roller 130 under such conditions automatically effects an equal but opposite positioning of roller 128.

The valve device 252 is only diagrammatically illustrated and its functions may be performed by any suitable arrangement or combination of devices known in the art. One suitable device is the 180° tracer, series 1300M made and sold by Rosebrook Inc. of Downey, California.

The flange edge engaging guide roller device 48 as embodied in the specific arrangement indicated in FIGS. 7-9 comprises the respective hydraulic cylinder devices 136 and 138 respectively mounted on suitable carriages 280 and 282 riding on a trackway 384 defined by support structure 286 that is defined by spaced side plates 288 and 290 joined together by top plate 292, a bottom plate 291, and other suitable reinforcement as may be necessary or desirable. Suitable flanges 293 and 295 are provided for mounting purposes. The carriages 280 and 282 each include an upright support frame 294 on which the respective rollers 128 and 130 and their driving motors 132 and 134 are suitably mounted, with the respective rollers 128 and 130 being disposed between the respective bearing units 296 and motors 132 and 134. The motors 132 and 134 may be in the form of suitable harmonic drives and are coupled to the respective rollers 128 and 130 in any suitable manner whereby they transmit forward moving motion to the end flange. Rollers 128 and 130 may be knurled at their driving surfaces 298 for improving traction.

In the form of FIGS. 7-9, cylinders 299 and 301 of the respective devices 136 and 138 are secured to their respective carriages 280 and 282, and their respective piston rods are secured to extensions 303 and 305 respectively that are keyed to the respective abutment structures 307 and 309 (that are made fast to support structure 286) as by employing suitable removable pins 311 applied to selected holes 313 formed in the piston rod extensions. Thus, in this embodiment, it is the cylinders rather than the pistons of devices 136 and 138 that move to shift rollers 128 and 130. Holes 313 of the piston rod extensions provide an additional spacing adjustment for rollers 128 and 130 both centered and off centered. Where space transversely of the feed path 46 is not a problem, cylinders with longer strokes can be employed as devices 136 and 138 without the adjustment feature provided by piston rod extensions 303 and 305.

Riding on plate 291 within the support structure 286 is a trolley 300 fixedly supporting a housing 302 in which the pinion 244 is suitably journaled as at 304. The rack bars 242 and 248 are slidably received through housing 302 in any suitable manner in meshing relation with the pinion 244 in the manner illustrated in FIG. 6, with the rack bars being suitably connected to the respective upright supports 294 by suitable rigid links 306. Top plate 292 is slotted in the region links 306 traverse. Tracer valve 252 is secured against movement on plate 291. If desired, links 306 can be mounted offside to the outside of support structure 286 and the other control components also mounted on the outside. Support structure 286 carries roller 131 (shown in FIG. 7) journaled on same in any suitable manner, as by employing suitable bearings 131A secured in place in any suitable manner.

Associated with the specific end flange guide roller device 48 of FIGS. 7-9 is an adjustment device indicated at 310 comprising a crank rod 312 having an operating handle 314 at one end portion 316 thereof and having its other end portion 318 threaded (as at 319) and threadedly received in housing 302, in alignment with and extending to valve 252 for contact with its spool push rod 252A, rod 312 being mounted for ready shifting movement longitudinally thereof within support structure 286, as at 315. This linear movement of rod 312 is ordinarily quite small except when the unit is set for a flange off center to the left and roller 130 is then fully retracted withdrawing rod 312 from contact with push rod 252A. Crank rod 312, for normal on center passage of end flanges along the feed path, is positioned with respect to housing 302 so that the valve 252 is in its null position, with pinion 244 in vertical alignment with the centerline of the feed path 46, and is held against push rod 252A by the action of device 138 on roller 130 and rack 248. The spool push rod 252A is spring biased to the right of FIGS. 6-9 for maintaining same in engagement with rod 312 in all possible positions of adjustment of valve 252.

While the double rack and pinion device of control arrangement 140 is preferred, other equal movement devices of suitable forms may be employed without departing from the scope of the invention.

Where it is desired to change device 48 to an offcenter (to the right) end flange accommodating position, the roller 130 is first fully retracted (with roller 128 automatically retracting the same amount), and crank rod 312 is rotated in the appropriate direction to feed it to the left, thus changing valve 252 to move roller 128 back toward the feed path centerline with pinion 244 rolling to the right along rack 248, roller 130 being maintained in its fully retracted position by appropriate positioning of valve 266. Manipulation of crank rod 312 is made to gradually back it off and return valve 252 to its null point when the roller 128 is positioned the desired amount less than roller 130 is from the feed path centerline so that the end flange, when contacted by the rollers 128 and 130, will dispose its off center weld joint line with the feed path centerline. If roller 130 should happen to be run inward without a flange between the rollers, roller 128 moves in an equal amount until it runs out of stroke. When this happens, crank rod 312 pushes tracer valve spool push rod 252A past the null point to the left, and the left end of push rod 252A operates a limit switch (not shown on the drawings) to shut off hydraulic pressure to roller 130's cylinder (stopping roller 130's inward movement) preventing damage to the racks, pinion, or the tracer valve.

If the web is to be off center to the right of the end flange, the roller 130 is moved to its farthest in position with roller 128 automatically moving in the same amount, and crank rod 312 is rotated in the appropriate direction to feed it to the right, thus changing valve 252 to move roller 128 away from the feed path centerline with pinion 244 rolling to the left along rack 248, roller 130 being maintained in its fully in position by appropriate positioning of valve 266. Manipulation of crank rod 312 is sufficiently gradual so that valve 252 is in its null point when roller 128 is positioned the desired amount more than roller 130 is from the feed path centerline. Valve 266 is then positioned to fully retract roller 130 with roller 128 moving out an equal amount until it runs out of stroke after which roller 130 continues to retract until it also runs out of stroke. Rod 312 withdraws from contact with valve 252 spool push rod 252A as roller 130 continues to move outward after roller 128 stops. A flange can now be inserted between rollers 128 and 130. Valve 266 is then positioned to cause roller 130 to move in. Roller 138 does not move in until roller 130 has moved in far enough to contact and push on valve 252 push rod 252A with the end of the crank rod extension 250 after which rollers 128 and 130 move in equally locating the flange as they do.

THE WELDING STATION

The support structure 60 (see FIGS. 1 and 10A) is in the form of a monocolumn 350 (see FIG. 10) of generally rectangular cross-sectional configuration provided with a suitable supporting base structure 352 and edge plates 354 and 356 affixed thereto that define the respective trackways 146 on either side of the column 350. Carriages 144 and 142 may be of any suitable type arranged for vertical floating movement along trackways 146, they extending between trackways 146 and being illustrated as including on either end thereof suitable opposed pairs of rollers 358 embracing the respective edge bars 354 and 356 for guiding purposes. The far side of the column 350 and the portions of carriage 142 and 144 associated therewith (in the position shown in FIG. 10) are the same but the reverse of that illustrated.

Platforms 62 and 64 are of any suitable construction and are fixed as by welding or bolting to the respective carriages 142 and 144. In the showing of FIG. 10 they are illustrated in their contracted relation relative to each other to indicate a narrow depth girder structure that can be handled by apparatus 10 (as does FIG. 16).

The platform 62 dependingly mounts a pair of mounting blocks 360 each of which has mounted on the depending end thereof a bearing structure 362 journaling the shaft 364 on which clamping roller 54 is mounted. Clamping roller 54 has its periphery recessed as at 366 to receive the edge 368 of the web it is applied against when a subassembly 13 is being fabricated. When the second end flange 12 (FIG. 1A) is being applied to the girder, roller 54 rides against the previously applied end flange 14.

Clamping roller 56 is suitably journaled and driven on platform 64 as by being mounted between a pair of drive units 370 which may be harmonic drives or other drives of suitable character that are driven synchronously to drive roller 56 for aiding in the moving of the subassembly at welding speed, and which are suitably mounted on platform 64. The periphery of roller 56 is preferably knurled to provide for increased tractive effort.

The hydraulic devices 90 are two in number, and are located on either side of the clamping rollers 54 and 56 in transverse alignment therewith (see FIG. 10A). They are operated by being incorporated in a suitable hydraulic circuit such as that indicated in FIG. 1 including suitable pump 371 supplying hydraulic liquid through suitable control valve 372 to the desired ends thereof in a simultaneous manner so that they operate in synchronism.

Turning now to the welding heads 36, it is preferred that they be arranged following the principles disclosed in said Ogden and Lawson patent for fillet welding purposes, and floating beam 162 and carriage 164 may be of the general type disclosed in said patent. In the form shown, the beam 162 rides between suitable rollers 380 that define a rollerway 382 for same, while the carriage 164 carries suitable rollers 384 that ride along post structure 166 and define rollerway 386 therefor. Rollerways 382 and 386 thus define substantially frictionless paths of movement for the beam 162 and carriage 164 that are perpendicularly related to each other in the manner indicated in FIG. 11.

The welding head hydraulic cylinder device 168 is mounted between the platform 64 and a suitable connection 388 of the carriage 164, while the welding head hydraulic cylinder device 169 is journaled between flanges 390 of carriage 164 and has its piston rod 392 suitably connected as at 394 to the carriage 162. The hydraulic devices 168 and 169 may be actuated in any suitable manner in the manner indicated to position and bias the welding heads in their operative welding positions, and remove them therefrom after the beam components being welded have passed same.

WEB EQUALIZING GUIDE ROLLER DEVICE

The fundamentals of operation of the web equalizing guide roller devices 52 are illustrated in FIG. 13 wherein it is illustrated that the rod end or chamber 400 of hydraulic cylinder device 158 is connected to the head end or chamber 402 of hydraulic cylinder device 156 by suitable conduit 404, while the head end or chamber 406 of device 158 is connected, through suitable control valve 407, to a suitable source 408 of hydraulic liquid under uniform pressure, such as a constant pressure pump or the like, in which the output is of uniform pressure but may be varied as desired, and the rod end or chamber 410 of device 156 is connected to tank. In the specific form of device 52 illustrated in FIG. 13, the piston 412 of device 156 has a double ended piston rod 414 that projects through the head end of the device, while the piston 416 of device 158 has a single ended piston rod 418 projecting through the rod end or chamber 400 thereof; the piston rod 414 is extended through the head end 402 of device 156 to insure that chambers 400 and 402 have equal displacement.

The head end 402 of cylinder device 156 and rod end 400 of cylinder device 158 together with their connecting conduit 404 are filled with hydraulic liquid, as is the head end 406 of cylinder device 158 and the rod end 410 of cylinder device 156.

When the web of a beam being fabricated is positioned to be engaged by the web-engaging rollers 152 and 154, hydraulic liquid under pressure is admitted to the head end or chamber 406 of cylinder device 158, which has the effect of simultaneously moving rollers 152 and 154 toward each other until they engage the web. If the web should include a thickened section, as such enters between rollers 152 and 154, rollers 152 and 154 will move apart equal distances to accommodate the thickened section. Web sections of reduced thickness are accommodated in a similar but opposite manner, rollers 152 and 154 moving toward each other in a synchronous manner in following the moving web. To retract rollers 152 and 154, chamber 410 of cylinder device 156 is disconnected from tank and connected to hydraulic pressure liquid source 428 by valve 422, while chamber 406 of cylinder device 158 is disconnected from its supply of hydraulic liquid and is connected to tank by valve 407.

Devices 52 may have connected thereto through a conduit 420 a suitable three-way control valve device 422 to permit the rollers 152 and 154 to be shifted to an offcenter position to accommodate webs that are disposed off the centerline of the end flange, where the apparatus 10 is set up to handle webs that are off center of the feed path, which is not true of the apparatus 10 as illustrated. During normal operation involving this alternate arrangement, the conduit 404 is connected to the indicated null position of valve 422, as at port 424, but, in the event the rollers 152 and 154 are to be positioned to the left of FIG. 13, valve 407 is positioned to connect chamber 406 to tank; after which valve 422 is positioned to bring conduit 420 into communication with its port 426, whereby hydraulic liquid under pressure from a suitable source 428 (such as a hydraulic pump of a suitable character) supplies hydraulic liquid under pressure through conduit 430 and valve 422 to conduit 404, which positions one or the other or both of the pistons 412 and 416 of the respective devices 156 and 158 to the left of their median positions illustrated in FIG. 13 within their respective cylinders (hydraulic liquid from rod end 410 of device 156 going to tank through conduit 412 and valve 422 and/or hydraulic liquid from head end 406 of device 158 going to tank through valve 407). It does not matter which piston does the moving since it is the volume of fluid added which determines the amount of offset to the left. If a reference position is desired, this can be achieved by first fully retracting the rollers. In the event that the rollers 152 and 154 are to be positioned to the right of their positioning shown in FIG. 13, chamber 410 or chamber 406 is locked out or, if the rollers are fully retracted with chamber 410 left under pressure, the valve 422 is moved to communicate conduit 420 with its port 432, whereby conduit 404 is connected to tank through suitable conduit 434 to permit, if chamber 410 is locked out or if the rollers are fully retracted with chamber 410 left under pressure, the pressure in the head end 406 of cylinder device 158 to position the piston 416 toward the right-hand end of its cylinder device 158. If, alternately, chamber 406 is locked out, pressure is supplied to chamber 410 displacing its piston 412 toward the right-hand end of its cylinder device 156. All of these procedures result in fluid leaving line 404 and going to tank after which valve 422 is positioned to block line 420. The volume of fluid removed determines the amount of offset to the right.

The modified device 52A of FIG. 14 operates in a manner that is identical to the device 52 of FIG. 13, the main difference being that the piston rod 414A of piston 412A (of device 156A) is single ended in character, similar to the piston rod 418A of piston 416A of device 158A. In order to insure that the displacement provided by either piston 412A or 416A will cause an equal displacement of the opposing piston, the piston rod 418A and the internal diameters of the cylinder are given diameters which will insure that the displacement of the cylinders 156A and 158A in the direction of their respective rod ends 400A and 410A will be equal. One appropriate diameter relation is a piston rod 418A OD of 3 inches and a cylinder ID of 5 inches for cylinder device 158A and a cylinder ID of 4 inches for the device 156A, which conforms to the basic relationship involved that the bore diameter $d$ of the smaller cylinder is to be equal to the square root of the square of the larger cylinder diameter $D$ minus the square of the rod diameter $R$ of the larger cylinder $\sqrt{(d=D^2-r^2)}$. Other diameter arrangements follow this formula or otherwise provide equal areas which serve equally as well.

Piston rod 414A may be of any suitable diameter since it does not affect the involved displacements. The pistons in devices 52 or 52A may have double ring sets with a bleed orifice in the piston wall between the rings ducted out through the piston rod to prevent fluid leaking past the pistons into the critical trapped volume of fluid. If the pistons seat out against the cylinder ends or, alternately, against adjustable stops at each full retraction, fluid can be introduced automatically into line 404 at this time to replace any fluid that may have leaked out of the critical trapped volume of fluid. Chamber 410 would be pressurized or locked out with its piston 412 seated out while replacement fluid was being introduced.

In the specific embodiment shown in FIGS. 15 and 16 of the device 52, the cylinder devices 156 and 158 are respectively mounted in tubular support members 440 each having their bases applied to the respective posts 148 and 150 by being clamped thereto, as by employing a clamping plate structure 444 secured to the respective bases 442 by suitable bolts 446.

The respective piston rods 414 and 418 of the respective devices 156 and 158 are each secured to a housing structure 448 that is slidably received over the ends of the respective support members 440, nylon liners 450 being interposed therebetween and carried by the respective housings 448. The housings 448 each include a shiftably mounted wing structure 452 in which the respective rollers 152 and 154 are journaled, and which can be adjusted longitudinally of the axes of the respective cylinder devices 156 and 158 by employing adjustment screws 454.

The devices 52 can be readily shifted vertically of posts 148 and 150 by loosening the clamp plate structures 444, shifting as desired, and retightening same.

FLANGE STRAIGHTENING DEVICE

Referring now to the specifics of the flange straightening device 58, which are shown in FIGS. 17–22, frame 170 comprises a base plate 460 having fixed thereto in upstanding relation a pair of spaced-apart side or mounting plates or walls 462 (see FIGS. 19 and 20). Suitably journaled between the walls 462 is cross-shaft 464 that projects outwardly beyond the respective plates 462 and has the respective swing arms 172 keyed to its respective outwardly projecting ends.

The respective arms 172 each comprise a bellcrank member 466 having cap members 467 and 468 that are secured to the body 466 by suitable bolts 469 to mount same on cross-shaft 464 as well as secure to same the respective shaft members 470 on the inner ends 472 of which clamping rollers 178 are suitably journaled. Shafts 470 are mounted for adjusting the rollers 178 between the swing arms 172 laterally of the feed path 46, and this may be done by loosening bolts 469 of cap 468 which are retightened to clamp shaft members in the desired position of adjustment.

Clamping roller 188 is mounted on a shaft 474 journaled between the respective side plates 462 and has keyed thereto a bull gear 476 driven by pinion 478 (FIG. 20) that is in turn driven by gear reducer 480 (providing a reduction on the order of 200 to 1) driven by a pair of suitable hydraulic motors 482 through suitable pulley or drive chain 484, and the respective pulleys or sprockets 481 and 483. Reducer 480 is secured to the side plate 462 adjacent same in any suitable manner, and motors 482 are suitably supported by bracket structure 485 on either side of the pulley or sprocket 483 they drive, to which they are coupled by suitable shaft 487.

It will be noted that the clamping rollers 178 are carried by the ends 486 of the respective swing arms 172, and the other ends 488 of such arms are secured to the cross head structure 182 by caps 490.

The cross head structure 182 (see FIGS. 17 and 22) comprises stub shafts 492 that are received in the respective arms 172, and that define centrally located recesses 494 in which are journaled the respective stub shafts 496 (in suitable bearing arrangement 498) that are fixed to the hydraulic cylinder device 184.

The hydraulic cylinder device 184 comprises a cylinder 500 defining end walls 502 and 504 of which end wall 504 is open as at 506 to freely pass piston rod 186, and end wall 502 is formed with a tubular extension 508 (that is closed by suitable plug 510 for receiving end portion 512 of piston rod 186. Plug 510 is formed as at 511 for connection to suitable hydraulic conducting for supplying hydraulic liquid to cylinder 500 via passages 513 and 515 formed in piston rod 186.

The other end portion 194 of piston rod 186 is slidably received in tubular member 514 of cross head structure 516 that is journaled between walls 462 of frame 170.

The tubular member 514 is threaded as at 522 for cooperation with adjustment member 190, the latter being formed with a recess 524 tapered as at 526 that receives a reduced terminal portion 528 of piston rod 186, which is proportioned in size so that abutment surface 530 of the piston rod rests on the end surface 532 of the adjustment member 190 when rod portion 528 is fully inserted within recess 524.

The tubular member 514 has secured thereto on either side thereof stub shaft structures 534 that are received in suitable bearing structures 536 mounted in the respective walls 462 of frame 170. Tubular member 514 includes a suitable plain bearing member 521 to guide the movements of piston rod 186.

As indicated in FIG. 17, the frame 170 has fixed to its upstream facing end a flange guide roller device 50A, which is the same in construction as the devices 50.

Connected between the respective arms 172 and sidewalls 462 of frame 170 are hydraulic cylinder devices 540. Devices 540 are pivotally connected as at 542 to an appropriate bracket structure 544 fixed to the respective walls 462, while the piston rod 546 of same at its head 548 is pivoted to the respective arms 172 as at 550, which pivotal connection is below the shaft 464.

The hydraulic cylinder devices 540 in the form illustrated are single acting in operation and are contracted to move the swing arms 172 from the full line position (the contracted or lowered position) to the broken line position of FIG. 17 (the fully opened or extended position), the arms 172 in the latter position being disposed at their wide open position to permit passage, under the rollers 178, of the end flange. Once elevated, shafts 470 are clamped near their outer ends 472A to place rollers 178 as near the weld joints as will still permit bending the flange to straighten it. After this has been accomplished, devices 540 are then connected to tank to permit gravity acting on arms 172 to bring rollers 178 into engagement with the upper surfaces of the end flange. The range of adjustment of rollers 178 laterally of the end flange is illustrated in dashed lines in FIG. 19.

During this operation, the piston rod 186 of hydraulic cylinder device 184 moves back and forth within tubular member 514 of cross head structure 516, the position of FIG. 22 being that achieved in the full line position of the swing arms 172 of FIG. 17, which is the fully retracted or lowered position in which the end flange can pass completely over arms 172.

When swing arms 172 have been disposed to rest rollers 178 on the upwardly facing surface of the end flange, the adjustment device 190 is turned into tubular member 514 until its surface 532 seats against the surface 530 of the piston rod 186 of hydraulic device 184 with movement still available in each direction to cylinder 500.

With the hydraulic device 540 remaining connected to tank, hydraulic device 184 (which is also single acting in nature) is actuated to move its cylinder 500 relative to piston 185 in the direction of cylinder end wall 502, thus causing arms 172 to act clockwise of FIG. 17, in a bellcrank like manner, to press rollers 178 downwardly on the top surface of the end flange. The pressure required is that which will be found to be necessary to overcome the tendency of the end flange to bow upwardly along the fillets as a result of the welding operation in progress and will vary depending on the thickness of the end flange, the distances of rollers 178 from the fillets, and other operating factors.

In spite of the comparatively long distance that rollers 178 can move between their fully raised and lowered positions (see FIG. 17), it has been found that for application of the required straightening forces, the piston of hydraulic cylinder device 184 can have a relative short stroke on the order of 2 to 3 inches.

The cross head connection between the arms 172 makes for synchronized operation of arms 172, and, to further insure synchronous action, arms 172 may be fixed together with a suitable tie plate structure where indicated at 560.

Either or both of hydraulic cylinder devices 184 and 540 may be made double acting in nature if so desired by employing suitable hydraulic controls that will permit efficient operation in the manner indicated. The illustrated single acting form is preferred for simplicity. Device 184 is retracted by operation of cylinder device 540 when rollers 178 are raised after device 184 is connected to tank.

To accommodate offcenter positioning within the limits defined by swing arms 172 (see FIG. 19) rollers 178 are adjusted as already indicated for positioning equidistant from the fillets, where the web is to be in alignment with the feed path centerline. Where the web is to be run through the feed line in an offcenter position, frame 170 may be suitably mounted for adjustment laterally of the feed path as required to dispose clamping roller 188 in vertical alignment with the web.

It thus will be seen that the straightener device 58 provides for simultaneous action of both flange-engaging rollers 178 and provides for ready adjustment to accommodate different flange thicknesses. The device also may be fully lowered or contracted to dispose the rollers 178 to an out of the way position when their function is not required. The clamping roller 188 being driven aids in feeding the beam components longitudinally thereof.

GENERAL SUMMARY

It will thus be seen that a method and apparatus has been provided for welding beam components together which calls for the beam components to be moved longitudinally thereof during the welding procedure, and furthermore, the beam components are welded together when disposed in the position in which they will be used and thus in the upright position of the beam.

Furthermore, the welding is done adjacent the point where the beam components pass through a floating welding head support and beam component clamping arrangement which compensates for any camber and irregularities or variations in the beam components and permits the welding heads to remain directly applied to the desired fillets to be welded.

While the hydraulic cylinder devices illustrated for raising and lowering the flange and web guide rollers, the welding station platforms, and the flange straightener, are shown arranged for single-acting operation, double-acting cylinder arrangements performing the functions indicated are contemplated, and, of course, they may be arranged in any suitable manner following the teachings of this application for that purpose in light of well established practices in the hydraulic field.

While the illustrated embodiments of the invention are shown arranged for assembling I-beam shaped structures, the invention is obviously readily adapted for making box beams or columns, double webbed I-beams, and applying cover plates to I-beams as by appropriately positioning the illustrated plate engaging rollers and welding heads for proper application to the plates being assembled following the teachings of this invention. Consequently, the appended claims are not to be construed as being limited to the making of I-beams.

As indicated, some fabricated beams are designed to have the web disposed to one side of the end flange longitudinal centerline. In the particular arrangements illustrated, this is accomplished by positioning the end flange to run off center while maintaining the web in alignment with the longitudinal center of the feed path through the welding station. However, the welding station, and in particular, the web-engaging guide roller devices and the welding heads are adapted to receive the beam components with the web disposed off center rather than the end flange, and roller 54 may be arranged for such adaptation by suitable provision for transverse adjustment of same.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. Apparatus for welding together beam web and flange components in the welding position of which the web component is disposed vertically and the flange component is disposed horizontally, with the web component resting on the flange component to define welding fillets along either side thereof, said apparatus comprising:
   a welding station at which beam web and flange components are to be welded along the fillets,
   means on either side of said station defining a feed path for feeding the web and flange components as disposed in said welding position thereof longitudinally thereof through said station, said welding station comprising clamping roller means for engaging said components and clamping same together at said station, and welding head means for welding the end flange and web components together at the fillets defined by same, flange guide roller means positioned upstream of said station and adjacent thereto including a set of guide rollers disposed on and engaging either edge of said end flange, web guide roller means positioned adjacent said station and including a set of guide rollers disposed on and engaging either side of said web, said guide roller means each including means for locating the respective beam components in alignment with said feed path, said flange roller means including means for automatically positioning the rollers thereof to maintain the locating action thereof on said flange component in response to variations in width of the flange component, means for straightening said flange component downstream of said station comprising:

clamping roller means positioned downstream of said station and adjacent thereto and adapted to engage either side of said flange component adjacent the fillets for restoring said flange component to coplanar relation, means for adjustably supporting said roller means and said welding head means to accommodate camber of said beam web component as the web and flange components pass through said station, and means for moving the web and end flange components through said station at welding speed.

2. The apparatus set forth in claim 1 including a cart operably associated with said feed path defining means on either side of said station, said carts being mounted for movement longitudinally of and in alignment with said feed path and being positioned relative thereto to support the ends of said components when same are being moved through said station.

3. The apparatus set forth in claim 1 including:

means for driving said flange guide roller means whereby said flange guide roller means comprise said moving means.

4. The apparatus set forth in claim 1 wherein:

said welding head means include means for supporting same to float independently of said station clamping roller means with respect to the web and flange fillets being welded.

5. The apparatus set forth in claim 1 wherein said web guide roller means includes means for equalizing the movements of said web guide rollers on either side of the web inwardly and outwardly of the web.

6. The apparatus set forth in claim 1 wherein:

said carts each include a vertically adjustable load support portion on which the respective ends of the flange component rest.

7. The apparatus set forth in claim 1 wherein said flange guide roller means and said roller positioning means thereof further comprise:

a hydraulic cylinder device for each of said rollers thereof for positioning same against the respective flange edges and comprising said locating means thereof, a rack member movable with each of the respective flange guide rollers, said rack members being disposed in parallel spaced apart relation transversely of said feed path, a pinion interposed between said rack members and meshing with both of said rack members, and a hydraulic liquid valve device operably connected to said pinion and one of said hydraulic cylinder devices for controlling the direction of bias applied by the flange guide roller controlled by same, with the other of said cylinder devices being connected to a source of hydraulic liquid under pressure at constant pressure conditions, said one hydraulic device being larger in capacity than said other hydraulic device.

8. The apparatus set forth in claim 1 wherein said welding station further comprises:

a vertical support column at one side of said feed path, upper and lower platforms positioned above and below said feed path and mounted on said column cantilever fashion for independent movement longitudinally of same, said welding station clamping roller means comprising an upper clamping roller carried by said upper platform and a lower clamping roller carried by said lower platform for rolling engagement with the beam components, said welding station clamping rollers being vertically aligned, means for adjustably supporting said lower platform including means for raising and lowering same, and means interposed between said platforms for biasing said platforms to clamp said welding station clamping rollers against the beam components.

9. The apparatus set forth in claim 8 including:

means for adjustably supporting said welding head means on one of said platforms, said welding head supporting means including means for supporting same to float independently of said station clamping roller means with respect to the web and flange fillets being welded.

10. The apparatus set forth in claim 8 wherein:

said web guide roller means is carried by one of said platforms, and including a second of said flange guide roller means carried by one of said platforms.

11. The apparatus set forth in claim 5 wherein said web guide roller means further comprises:

a hydraulic cylinder device for each of said rollers thereof biasing same against the respective sides of the webs, said equalizing means comprising means for hydraulically connecting said devices for equal but opposite movement of web guide rollers engaging either side of the web, and means for hydraulically biasing said web guide rollers against the web through said cylinder devices thereof.

12. The apparatus set forth in claim 1 wherein said flange component straightening means further comprises:

a platform positioned below said feed path and means for adjustably supporting same including means for raising and lowering same, a pair of bellcrank swing arms pivotally mounted intermediate their respective ends for swinging action about a horizontal axis extending transversely of said feed path, said clamping rollers of said straightening means comprising a roller carried by each of said arms in vertical alignment with said path of movement and adjacent like ends thereof and mounted for adjustment laterally of said path of movement, and a roller journaled on said platform below said path of movement and in substantial vertical alignment with the centerline of same, said arms being positioned to dispose said rollers thereof on either side of said platform roller and being shaped to swing said rollers thereof between a lowered retracted position below said feed path and an upper extended position above the position of the flange component when in said feed path, said arms being connected together for synchronous movement, a cross head structure connecting the other ends of said arms below said feed path, an adjustable stop structure carried by said platform, and a hydraulic cylinder device interposed between said stop structure and said cross head structure for clamping said rollers of said arms against the upper surface of either side of the flange component when the latter passes over said platform roller to apply a bending stress to the flange component about said platform roller whereby said flange component may be biased to coplanar relation after the welding of said fillets, and means for moving said arms between said retracted and extended positions independently of said cylinder device.

13. The apparatus set forth in claim 1 wherein said guide roller means, said welding heads, and said flange straightening means include means for positioning same to accommodate offcenter positioning of the beam components with respect to said feed path.

14. In the art of fabricating I-beams and the like, the method of welding a beam web component that is cambered in the plane thereof to a beam end flange component, which method comprises:

disposing the beam end flange and web components so that said flange component is in a substantially horizontal position and the web is positioned on the end flange component in longitudinal alignment therewith and in a substantially vertical plane, driving the web and end flange components as a unit longitudinally thereof along a feed path through a welding station while maintaining them clamped together at said welding station, separately supporting said components at said station and adjacent the leading and trailing ends of same, and maintaining said components in alignment with said feed path, automatically adjusting vertical application to said components of said driving and clamping steps, and the support of said components at said station in accordance with the elevational positioning of the portions of said components passing through said station, due to said camber, relative to the supported level of the leading and trailing ends thereof, and applying at said station a longitudinally stationary welding arc along at least one of the fillets defined by the web and end flange components to weld the web component to the flange component to form a beam subassembly while floating the arc vertically and laterally at said station to follow the contours of the beam subassembly.

15. The method set forth in claim 14 wherein downstream of said station the flange component is biased against bowing due to welding at said fillets.

16. In apparatus for welding together beam web and flange components in the welding position of which the web component is disposed vertically and the flange component is disposed horizontally, with the web component resting on the flange component to define welding fillets along either side thereof, wherein said apparatus includes a welding station at which the beam web and flange components are to be welded along the fillets, and means on either side of said station defining a feed path for feeding the web and flange components as disposed in said welding position thereof longitudinally thereof through said station, a flange guide device therefor comprising:

flange guide roller means positioned upstream of said station and adjacent thereto including a set of guide rollers disposed on and engaging either edge of said end flange, said guide roller means each including means for centering said flange component in alignment with said feed path, said roller means further including means for automatically positioning the rollers thereof to maintain the centering action thereof on said flange component in response to variations in width of the flange component, said flange guide roller means and said roller positioning means thereof further comprising:

a hydraulic cylinder device for each of said rollers thereof for positioning same against the respective flange edges and comprising said centering means thereof, a rack member movable with each of the respective flange guide rollers, said rack members being disposed in parallel spaced-apart relation transversely of said feed path, a pinion interposed between said rack members and meshing with both of said rack members, and a hydraulic liquid valve device operably connected to said pinion and one of said hydraulic cylinder devices for controlling the direction of bias applied by the flange guide roller controlled by same, with the other of said cylinder devices being connected to a source of hydraulic liquid under pressure at constant pressure conditions, said one hydraulic device being larger in capacity than said other hydraulic device.

17. In apparatus for welding together beam web and flange components in the welding position of which the web component is disposed vertically and the flange component is disposed horizontally, with the web component resting on the flange component to define welding fillets along either side thereof, wherein said apparatus includes a welding station at which the beam web and flange components are to be welded along the fillets, and means on either side of said station defining a feed path for feeding the web and flange components as disposed in said welding position thereof longitudinally thereof through said station, said welding station further comprising:

clamping roller means for engaging said components and clamping same together at said station, and welding head means for welding the end flange and web components together at the fillets defined by same, a vertical support column at one side of said feed path, upper and lower platforms positioned above and below said feed path and mounted on said column cantilever fashion for independent movement longitudinally of same, said welding station clamping roller means comprising an upper clamping roller carried by said upper platform and a lower clamping roller carried by said lower platform for rolling engagement with the beam components, said welding station clamping rollers being vertically aligned, means for adjustably supporting said lower platform including means for raising and lowering same, and means interposed between said platforms for biasing said platforms to clamp said welding station clamping rollers against the beam components.

18. The apparatus set forth in claim 17 including:

means for adjustably supporting said welding head means on one of said platforms, said welding head supporting means including means for supporting same to float independently of said station clamping roller means with respect to the web and flange fillets being welded.

19. In apparatus for welding together beam web and flange components in the welding position of which the web component is disposed vertically and the flange component is disposed horizontally, with the web component resting on the flange component to define welding fillets along either side thereof, wherein said apparatus includes a welding station at which the beam web and flange components are to be welded along the fillets, and means on either side of said station defining a feed path for feeding the web and flange components as disposed in said welding position thereof longitudinally thereof through said station, a web guide device therefor comprising:

web guide roller means positioned adjacent said station and including guide rollers disposed on and engaging either side of said web and arranged to form sets of opposing guide rollers, said guide roller means including means for centering said web in alignment with said feed path, and means for equalizing the movements of said opposing web guide rollers of each set on either side of the web inwardly and outwardly of the web, a hydraulic cylinder device for each of said rollers thereof for biasing same against the respective sides of the webs, said cylinder devices comprising said centering means, said equalizing means comprising means for hydraulically connecting said cylinder devices of the respective sets of opposing rollers for equal but opposite movement of the guide rollers thereof, and a source of hydraulic pressure liquid connected to one of said cylinder devices of the respective sets and having said connection oriented with respect to same and the other cylinder device thereof such that both said rollers of the respective sets are biased against said web.

20. In apparatus for welding together beam web and flange components in the welding position of which the web component is disposed vertically and the flange component is disposed horizontally, with the web component resting on the flange component to define welding fillets along either side thereof, wherein said apparatus includes a welding station at which the beam web and flange components are to be welded along the fillets, and means on either side of said station defining a feed path for feeding the web and flange components as disposed in said welding position thereof longitudinally thereof through said station, with said welding station including welding head means for welding the end flange and web components together at the fillets defined by same, means for straightening said flange component downstream of said station to overcome bowing of the flange at the fillets welded, said straightening means comprising:

clamping roller means positioned downstream of said station and adjacent thereto and engaging either side of said flange component for restoring said flange component to coplanar relation, a frame positioned below said feed path and means for adjustably supporting same including means for raising and lowering same, a pair of bellcrank swing arms pivotally mounted intermediate their respective ends for swinging action about a horizontal axis extending transversely of said feed path, said clamping rollers of said straightening means comprising a roller carried by each of said arms in vertically alignment with said path of movement and adjacent like ends thereof and mounted for adjustment laterally of said path of movement, and a roller journaled on said frame below said path of movement and in substantial vertical alignment with the centerline of same, said arms being positioned to dispose said rollers thereof on either side of said frame roller and being shaped to swing said rollers thereof between a lowered retracted position below said feed path and an upper extended position above the position of the flange component when in said feed path, said arms being connected together for synchronous movement, a cross head structure connecting the other ends of said arms below said feed path, an adjustable stop structure carried by said frame, and a hydraulic cylinder device interposed between said stop structure and said cross head structure for clamping said rollers of said arms against an upper surface of either side of the flange component when the latter passes over said frame roller to apply a bending stress to the flange component about said frame roller whereby said flange component may be biased to coplanar relation after the welding of said fillets, and means for moving said arms between said retracted and extended positions independently of said cylinder device.

\* \* \* \* \*

UNITED STATES PATENT OFFICE
CERTIFICATE OF CORRECTION

PO-1050
(5/69)

Patent No. 3,634,644      Dated January 11, 1972

Inventor(s) Ralph Ogden and William P. Lawson

It is certified that error appears in the above-identified patent and that said Letters Patent are hereby corrected as shown below:

In the Abstract, line 15, for "i" read -- is --;
Column 19, line 51, for "1" read -- 2 --.

Signed and sealed this 13th day of June 1972.

(SEAL)
Attest:

EDWARD M. FLETCHER, JR.
Attesting Officer

ROBERT GOTTSCHALK
Commissioner of Patents